(12) United States Patent
Fäßler et al.

(10) Patent No.: US 11,512,490 B2
(45) Date of Patent: Nov. 29, 2022

(54) AUTOMATED PARKING DEVICE

(71) Applicant: Klaus Multiparking GmbH, Aitrach (DE)

(72) Inventors: Norbert Fäßler, Haslach (DE); Fabian Zobel, Haslach (DE)

(73) Assignee: Klaus Multiparking GmbH, Aitrach (DE)

( * ) Notice: Subject to any disclaimer, the term of this patent is extended or adjusted under 35 U.S.C. 154(b) by 105 days.

(21) Appl. No.: 16/969,294

(22) PCT Filed: Feb. 12, 2019

(86) PCT No.: PCT/EP2019/053446
§ 371 (c)(1),
(2) Date: Aug. 12, 2020

(87) PCT Pub. No.: WO2019/155088
PCT Pub. Date: Aug. 15, 2019

(65) Prior Publication Data
US 2020/0399102 A1    Dec. 24, 2020

(30) Foreign Application Priority Data

Feb. 12, 2018 (DE) .......................... 202018100746.7
May 28, 2018 (DE) .......................... 202018102976.2
Nov. 12, 2018 (DE) .......................... 202018106415.0

(51) Int. Cl.
*E04H 6/06* (2006.01)
*B66F 7/02* (2006.01)
(Continued)

(52) U.S. Cl.
CPC ................. *E04H 6/06* (2013.01); *B66F 7/02* (2013.01); *B66F 7/28* (2013.01); *E04H 6/188* (2013.01);
(Continued)

(58) Field of Classification Search
CPC ..... B66F 7/02; B66F 7/28; E04H 6/06; E04H 6/188; F16H 55/34; F16H 2007/185
See application file for complete search history.

(56) References Cited

U.S. PATENT DOCUMENTS 3,027,024 A    3/1962  Baume
4,178,094 A *  12/1979 Silverberg ................ F16H 7/24
                                                   474/102
(Continued)

FOREIGN PATENT DOCUMENTS

CN    102041911 A    5/2011
DE      4208713 A1    9/1993
(Continued)

OTHER PUBLICATIONS

Australian Office Action for Application No. 2019219324 dated Feb. 19, 2021 (4 pages).
(Continued)

*Primary Examiner* — James Keenan
(74) *Attorney, Agent, or Firm* — Reising Ethington, P.C.

(57) ABSTRACT

The disclosure relates to an automated parking device comprising a frame, on which at least one movable, in particular raisable or lowerable platform is provided, and the automated parking device is equipped with a chain, part of which forms at least part of a chain deflection system. The chain deflection system consists of at least one chain piece, preferably a roller chain piece, and a deflection piece.

13 Claims, 11 Drawing Sheets

(51) Int. Cl.
  *B66F 7/28*   (2006.01)
  *E04H 6/18*   (2006.01)
  *F16H 55/34*  (2006.01)
  *F16H 7/18*   (2006.01)

(52) U.S. Cl.
  CPC ....... *F16H 55/34* (2013.01); *F16H 2007/185* (2013.01)

(56) References Cited

U.S. PATENT DOCUMENTS

| | | | | |
|---|---|---|---|---|
| 4,206,994 A | * | 6/1980 | Silverberg | G03G 15/754 198/841 |
| 5,799,441 A | * | 9/1998 | Shibata | E05F 11/481 49/352 |
| 5,961,411 A | * | 10/1999 | Tsutsumi | F16H 7/18 474/140 |
| 2020/0339398 A1 | | 10/2020 | Fäßlr et al. | |

FOREIGN PATENT DOCUMENTS

| | | |
|---|---|---|
| DE | 19508492 A1 | 9/1996 |
| DE | 19533887 A1 | 3/1997 |
| DE | 29802155 U1 | 6/1999 |
| DE | 112016002650 T5 | 3/2018 |
| WO | WO2019129813 A1 | 7/2019 |

OTHER PUBLICATIONS

English Translation of International Search Report for International Application No. PCT/EP2019/053446 dated Jul. 4, 2019 (2 pages).

* cited by examiner

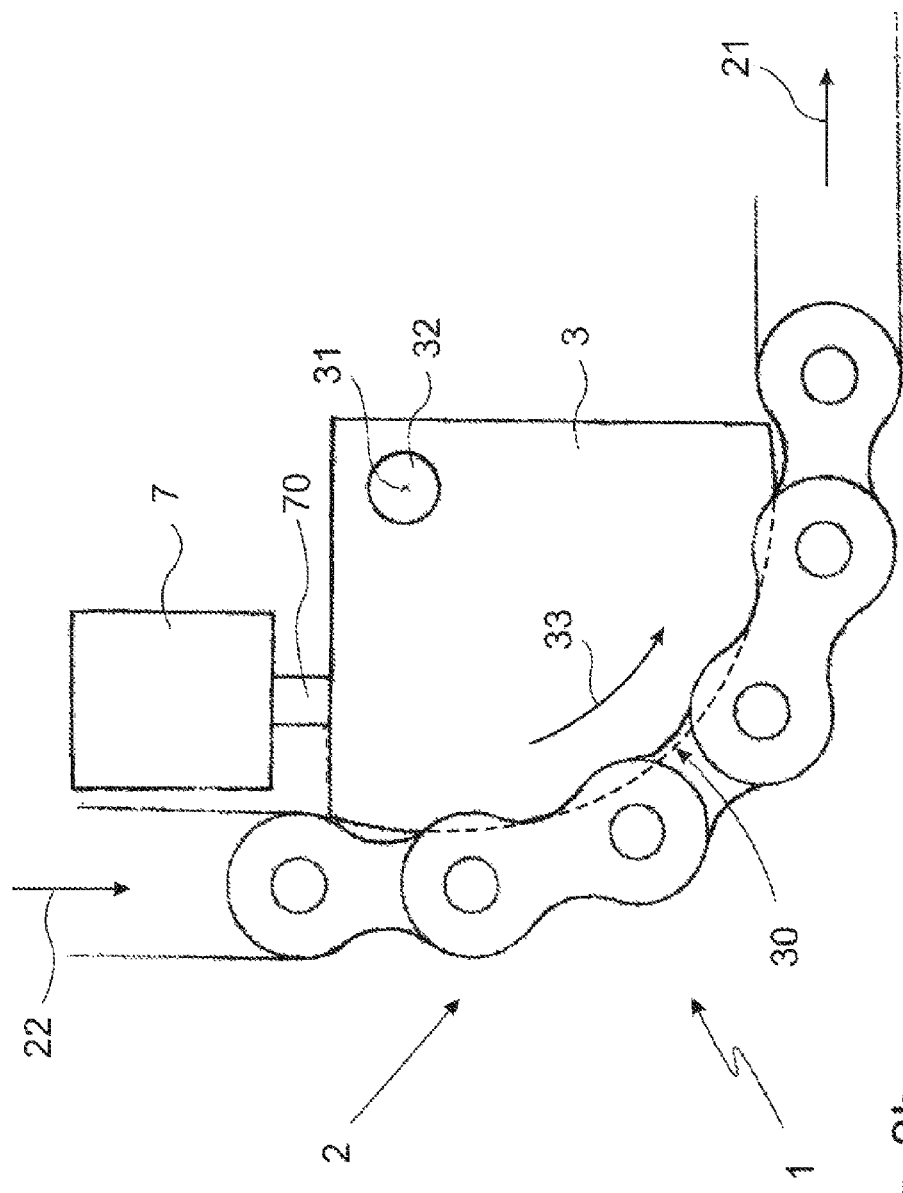

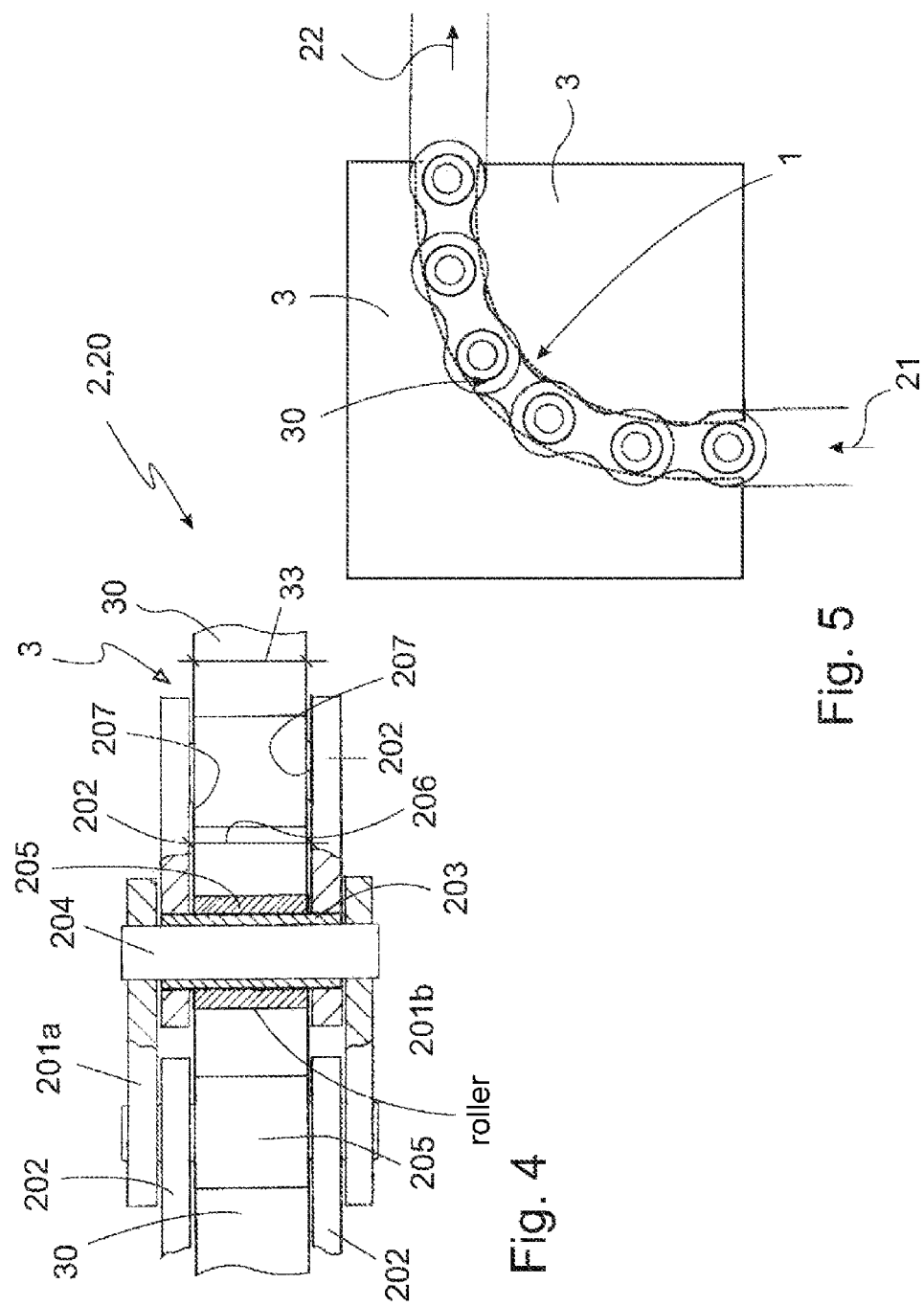

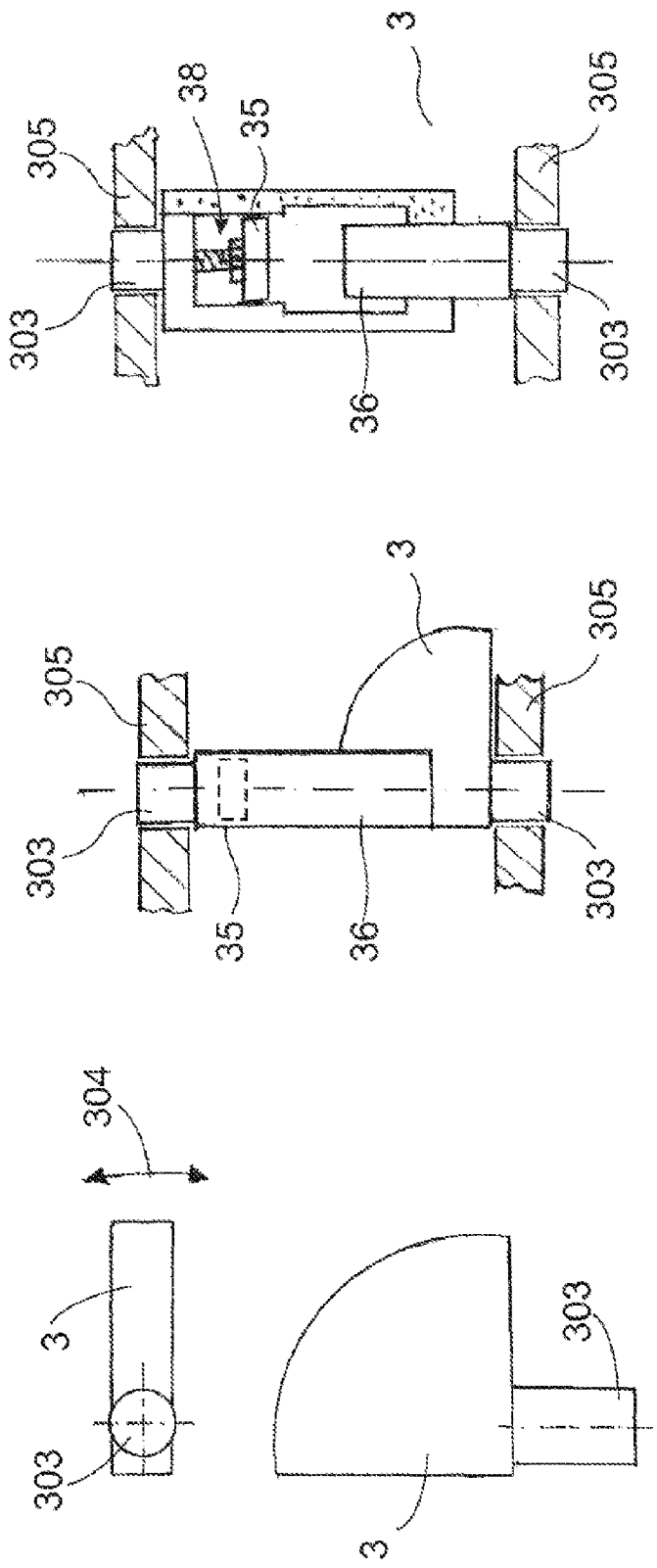

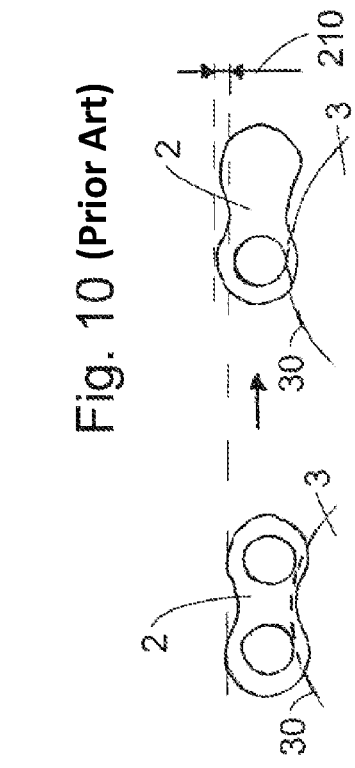
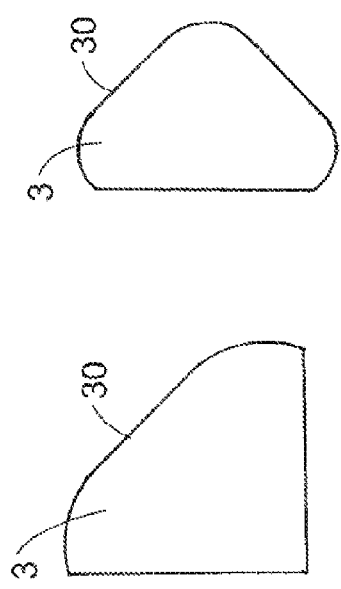
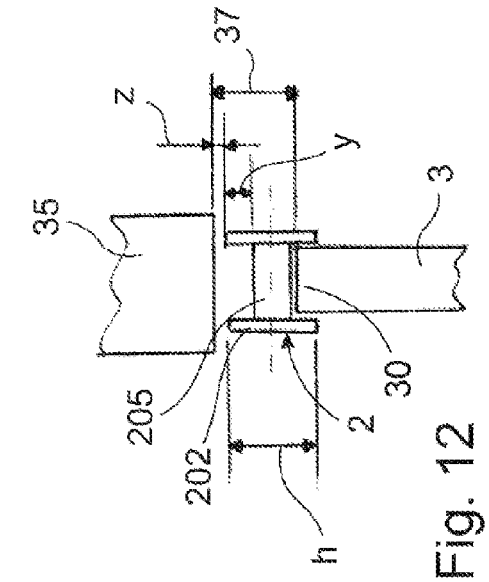
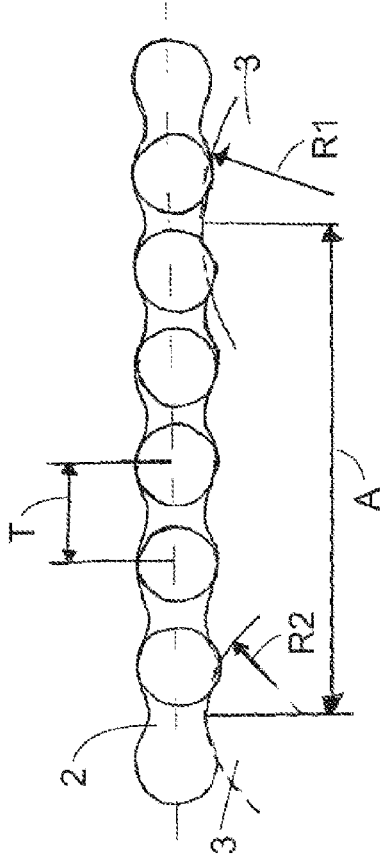

AUTOMATED PARKING DEVICE

INTRODUCTION

The disclosure relates to an automated parking device having a frame on which at least one movable, in particular liftable or lowerable, platform is provided, the automated parking device being equipped with a chain which is at least partially part of at least one chain deflection system. The chain deflection system is composed of at least one chain piece, preferably a roller chain piece, and a deflection piece.

An automated parking device of the generic type having a chain deflection system is known, for example, from the German patent document 195 33 887 of the applicant.

In this prior art, a roller assembly is provided as the deflection piece of the chain deflection system described herein. The roller assembly requires a rotatable mounting of the roller and therefore a higher level of complexity.

SUMMARY

The disclosure is based on, according to at least one embodiment, the object of improving said prior art and on providing in particular a more cost-effective solution for a chain deflection system.

This object of the disclosure is achieved, according to at least one embodiment, by an automated parking device having a frame on which at least one movable, in particular liftable or lowerable, platform is provided, the automated parking device being equipped with a chain which is at least partially part of at least one chain deflection system, wherein the chain deflection system is composed of at least one chain piece, preferably a roller chain piece, and a deflection piece which has a curved face, the chain piece in the applied state at least partially bearing on the curved face, on account of which the direction of traction or compression of the chain piece is deflected, wherein the respective deflection piece is disposed on the frame or on the platform and the deflection piece is disposed such that the latter has a degree of freedom in terms of rotation of less than 360°.

In order for the object to be achieved, the disclosure proceeds, according to at least one embodiment, from a chain deflection system which is composed of a chain piece, preferably a roller chain piece, and a deflection piece, wherein the deflection piece has a curved face and the chain piece in the applied state at least partially bearing on the curved face, on account of which the direction of traction of the chain piece is deflected or becomes diverted, respectively.

The novel deflection piece proposed in the automated parking device according to the disclosure for functioning according to the disclosure does not require any rotatable, in particular continuously rotating, mounting (such as a ball bearing, for example), as with the roller assembly proposed in the prior art or the known rotatably mounted chain wheels. On account thereof, the costs for the entire chain deflection system are significantly reduced. The assembly is also sufficiently resistant to wear since roller chains are preferably used in which the chain parts bearing on the face are mounted so as to be rotatable in the respective chain link plates, thus permitting a rolling movement of the moved chain piece in relation to the deflection piece. The combination of a roller chain having a non-continuously rotating deflection piece is particularly suitable for low speeds of the chain piece and at the same time for high loads which are moved by the chain piece. Operating states of this type of the chain piece usually exist in an automated parking device in which the chain piece is used for lifting and lowering the platform.

The chain deflection system proposed according to the disclosure, according to at least one embodiment, herein is not only proposed for an automated parking device which is likewise according to the disclosure but in itself possesses further substantial advantages which can be advantageously used also in other applications, not only in automated parking devices. A chain deflection system independent of an automated parking device, wherein the chain deflection system is composed of at least one chain piece, preferably a roller chain piece, and a deflection piece which has a curved face, the chain piece in the applied state at least partially bearing on the curved face, on account of which the direction of traction or compression of the chain piece is deflected, the deflection piece being disposed such that the latter has a degree of freedom in terms of rotation of less than 360°, is thus explicitly disclosed and described.

It is provided according to the disclosure, per at least one embodiment, that the deflection piece is disposed such that the latter has a degree of freedom in terms of rotation of less than 360°. A particularly positive improvement of the prior art is achieved in that the deflection piece has a limited degree of freedom in terms of rotation. A revolving rotary mounting of the deflection piece is not required on account thereof. The complexity in terms of the production of a chain deflection system is significantly reduced by saving such a rotary mounting. At the same time, the reliability of the system is enhanced since no rotating bearing or rotary bearing which can fail due to wear is required. The simplest solution lies in disposing the deflection piece in a rigid manner such that the latter in terms of rotation does not have any degree of freedom at all. In order to be deflected, the chain piece simply runs over at the curved face of the deflection piece. In the embodiment in which the chain piece is formed by a roller chain piece, the chain rollers roll on the curved face, wherein the deflection piece is passive and remains unmoved. In some specific applications which will be described further below, it may be advantageous for the deflection piece to have at least a minor degree of freedom in terms of rotation. In order for detectors which monitor the correct functioning of the chain deflection system to be disposed, a degree of freedom in terms of rotation of 0.1 to 5°, 10°, or else 15°, may thus be advantageous, for example. Furthermore, degrees of freedom in terms of rotation of the deflection piece may be provided in a range up to a full rotation, this corresponding to 360°. The degree of freedom in terms of rotation according to the disclosure is also less than 360° and is preferably 30°, 60°, 90°, 120°, 150°, 180°, 210°, 240°, 270°, 300°, or 330°.

A degree of freedom in terms of rotation is to be understood to be a degree of freedom which enables rotation of the curved face about an axis which runs so as to be parallel to the curved face or at least parallel to part of the curved face. The curved face in terms of the developed view thereof is embodied so as to be elongate, that is to say that said curved face has a length dimension which is significantly longer than the dimension in terms of width. The developed view is favorably embodied in the form of a rectangle. The width dimension of said rectangle is slightly smaller than the width of the chain rollers of a chain piece embodied as a chain roller piece. The length dimension in turn is embodied so as to be significantly longer than the width dimension. The length dimension is typically longer than the width dimension by a factor of five or more. It is achieved on account thereof that the chain piece is guided in the transverse direction by the width dimension of the curved face, and in the longitudinal direction, that is to say in the direction of movement of the chain piece, bears on the curved face by way of a plurality of chain rollers. The length dimension and the length dimension to width dimension ratio also depend on the chain pitch, that is to say depend on the spacing of two adjacent chain rollers. The larger said chain pitch the longer the chosen length dimension so as to guarantee that a plurality of chain rollers bear on the sliding piece at all times. The curved face in terms of the developed view thereof can be described as a rectangle. The curved face in this instance is created from the developed view by a curvature which can typically be described about an axis which runs so as to be parallel to the width dimension. The degree of freedom in terms of rotation described above is present in relation to an axis which runs so as to be parallel to the width dimension and thus also parallel to the curvature axis of the curved face. The previously used terms developed view and curvature axis serve for describing the deflection piece in mathematical/geometrical terms and are not physical features which are present in a real deflection piece. Said terms serve for explaining the disclosure to the person skilled in the art.

In one design embodiment of the proposal it is provided that the deflection piece is mounted so as to be pivotable or longitudinally movable, wherein the arrangement is chosen such that no infinite rotatable mounting of the deflection piece is provided. The deflection piece in this embodiment is pivotably mounted. A pivotable mounting is to be understood that a degree of freedom in terms of rotation is provided, as has been described above, on the one hand. Additionally or alternatively, a pivotable mounting in other spatial directions can also be provided. For example, a mounting which is pivotable about a spatial axis which extends so as to be orthogonal to the curved face or at least orthogonal to part of said curved face, may thus also be provided. A pivotable mounting of this type is advantageous, according to at least one embodiment, for compensating tolerances in the chain deflection system or to prevent jamming of the chain piece on the deflection piece. Alternatively or additionally, a mounting which is longitudinally movable may also be provided for the deflection piece. A longitudinally movable mounting is to be understood to be a degree of freedom in translatory terms. A longitudinally movable mounting can be provided in a plurality of spatial directions. A mounting of the deflection piece that is longitudinally movable in directions in which the chain piece runs toward the deflection piece or runs away from the latter is favorably provided.

It is furthermore provided that the deflection piece does not have any degree of freedom in terms of rotation. The deflection piece in this embodiment is rigidly mounted so as to be immovable, and in the assembled state does not have any kind of degree of freedom.

In one design embodiment it is provided that the chain piece is embodied as a roller chain piece and the chain rollers of said roller chain piece contact the curved face of the deflection piece and in a movement of the chain piece roll on the curved face. The chain piece in this embodiment is embodied as a roller chain piece. A roller chain has chain rollers which are mounted so as to be rotatable about axes on or in the chain. Said chain rollers are thus rotatably movable and on account thereof can roll on a rigidly disposed face, such as the curved face of the deflection piece. A rolling movement of the chain rollers thus takes place in the deflection of the chain piece by the deflection piece. Said rolling movement causes substantially less wear to the chain deflection system than a purely sliding movement of the chain piece relative to the deflection piece, said sliding movement however likewise being part of the disclosure. An embodiment of the chain piece as a roller chain thus offers further advantages, according to at least one embodiment, in terms of the service life and reliability of the entire chain deflection system.

It is expediently provided that the chain deflection system has two deflection pieces, wherein the chain piece at least partially bears on the curved faces of both deflection pieces. In this embodiment, the chain piece is deflected by two or more deflection pieces. The chain piece herein bears on each of said deflection pieces. By providing a plurality of deflection pieces, the chain piece can be deflected (successively) in a plurality of spatial directions. A deflection piece herein can be embodied such that said deflection piece deflects the chain piece in such a manner that the chain piece under tension slides along on the deflection piece and the spatial direction of said chain piece is thus deflected under tension. Alternatively, a deflection piece can be embodied such that said deflection piece deflects the chain piece in a thrust operation. The chain piece in the thrust operation, in comparison to the operation under tension, bears on the opposite side of the deflection piece. Details pertaining to the deflection in the operation under tension and thrust are described in conjunction with an embodiment further below. The two deflection pieces in terms of the type thereof can be freely combined with one another, any combinations of deflection pieces conceived for the operation under tension and operation under thrust being conjointly disclosed here.

In one further embodiment it is provided that the chain piece in a first region from a locationally fixed clamping point runs vertically to a first deflection piece, the chain piece subsequently in a second region from the first deflection piece runs horizontally to a second deflection piece, and finally in a third region from the second deflection piece runs vertically to a further locationally fixed clamping point. The chain deflection system in this embodiment comprises two clamping points which are disposed so as to be locationally fixed. The chain piece at one of the ends thereof is fastened to said clamping points. Such a clamping point can be, for example, a screw fitting on the floor or on the ceiling. The clamping point can however also be disposed so as to be locationally fixed on a frame or a framework of a device, for example of an automated parking device. The chain piece runs between the two clamping points. Two deflection pieces are disposed between the two clamping points. From the first locationally fixed clamping point the chain piece first runs vertically upward to a first deflection piece where the chain piece is deflected by 90°, thus now running horizontally after the first deflection piece. The second deflection piece where the chain piece is deflected in the other direction by 90°, specifically in a vertical upward manner, is disposed at the end of this horizontally running region. An embodiment of this type of a chain deflection system is particularly suitable for achieving synchronized running in a parking device. Of course, two locationally fixed clamping points and two deflection pieces may also be mutually disposed in any arbitrary different manner so as to deflect the chain piece twice in succession. More than two deflection pieces by way of which the chain piece is guided may also be provided between the two locationally fixed clamping points. The provision of more than two deflection pieces may be necessary or useful, for example depending on where the introduction of force for moving the movable part of the device takes place in a parking device.

It is furthermore expediently provided, according to at least one embodiment, that the two locationally fixed clamping points are disposed on opposite sides of the horizontally running second region of the chain piece. The chain piece in this embodiment runs such that the first vertical chain piece that is deflected by a first deflection piece extends in the one direction toward the subsequent second region that runs so as to be substantially horizontal. The third vertically running region of the chain piece that is deflected by the second deflection piece is disposed on the opposite side of the second horizontally running region. On account of such an arrangement, the chain deflection system in a horizontal direction extends in the length of the second region of the chain piece and in the horizontal direction extends in the length of the sum of the lengths of the first and of the third region of the chain piece.

It is provided, according to at least one embodiment, that the deflection piece is embodied as a plate-shaped disk. Plate-shaped here is to be understood that the deflection piece has flat primary faces. The functional region of the deflection piece is the curved face on which the chain piece bears. The other faces or surfaces of the deflection piece do not directly participate in the deflection of the chain piece. As has been described further above, the curved face in the developed view has a rectangular elongated shape. The curved face which is important in terms of the function of the deflection piece is created by the curvature of said developed view about at least one curvature axis. The deflection piece in the embodiment described here is embodied as a disk, wherein the curved face forms part of the narrow lateral edge of said disk. The large surfaces of the disk are the flat or planar primary surfaces. The fastening elements for the deflection piece are favorably disposed in the primary faces, or so as to penetrate the two primary faces, respectively. On account of this arrangement, the chain piece running about the curved face disposed laterally on the disk does not come into contact with the fastening elements. The deflection piece embodied as a plate-shaped disk can have a circular primary face, for example. Of course, the primary faces may also assume other shapes. Primary faces which have the shape of a segment of a circle are very useful in practice, wherein the curved face of the segment of the circle forms the curved face for deflecting the chain piece, wherein the straight edges of the segment of the circle form the other limitations of the deflection piece embodied as a disk. A deflection piece thus embodied may also be described as a sub-segment or a sector of a deflection piece embodied as a circular disk.

It is furthermore provided in the proposal, according to at least one embodiment, that the deflection piece is embodied as a segment of a plate-shaped disk, wherein the curved face of the deflection piece is a length of 5° to 360°. The deflection piece in this embodiment is a segment of a plate-shaped disk. Such a segment is part of a circular disk. The curved region of this segment forms the curved face. The two other delimitations of the segment that run in a rectilinear manner form an angle in relation to one another. This angle is favorably 5° to 360°. The angle between the two straight legs of the deflection piece embodied as a segment of a circle may also be referred to as the length of the curved face running between the two legs. The length of the curved face running between said legs is therefore 5° to 360° for an angle of 5° to 360° between the two straight legs of a segment of a circle.

It is furthermore provided, according to at least one embodiment, that the deflection piece is embodied as a 90° segment of a plate-shaped disk. The deflection piece in this embodiment is of a particularly simple embodiment and has the shape of a quadrant. Such a deflection piece can be produced in a particularly simple manner by dividing a circular disk into four parts. On account of the shape of a 90° segment, the curved face is sufficiently long so as to deflect a chain piece by 90°, this being sufficient for many specific applications.

In one design embodiment it is provided that the curved face of the deflection piece is curved so as to be convex or concave. The curvature of the curved face may be embodied in two directions. In the case of a curved face which is curved in a convex manner, a chain piece under tension is deflected along the curved face. In the case of a curved face which is curved in a concave manner, a chain piece under compression is diverted.

It is expediently provided, according to at least one embodiment, that the curved face of the deflection piece is configured so as to be helical, having a length from 180° to 720°. The curved face of this embodiment runs in a helical manner. Besides the curvature of the curved face which has already been described above and which serves for deflecting the chain piece, the curved face extends over a length of more than 360° and is stretched in a spiral or helical manner along a longitudinal direction. The chain piece revolves multiple times about such a deflection piece and herein is not only discharged from the deflection piece at another angle in relation to the original direction, but also so as to be offset from the original position in the direction of the chain width. Such a helical curved face thus offers the advantage of deflecting the chain piece also along the width direction of the latter. Further possibilities for deflecting and guiding a chain piece in three-dimensional space are derived on account thereof.

In one further embodiment it is provided that the deflection piece has a thickness which is slightly less than the inner spacing between the opposite inner chain link plates of the chain configured as a roller chain. The thickness of the deflection piece in this embodiment is chosen such that said deflection piece fits between the opposite link plates of a roller chain. On account thereof, the chain rollers bear on the curved face of the deflection piece when guiding the chain piece over the deflection piece. The peripheries of the primary faces of the deflection piece herein guide the link plates of the roller chain.

In one design embodiment it is provided that a downholder which is disposed at a spacing from the curved face of the deflection piece is provided, the chain piece being guided through said spacing and on account of the conjoint guiding of the deflection piece and the downholder being unable to depart from said spacing. In this embodiment a downholder which prevents the chain piece from unintentionally jumping from the deflection piece or otherwise departing from the latter is provided. The chain piece is guided with the clearance between the curved face of the deflection piece and the downholder. Said clearance is however dimensioned such that the chain piece when in operation can move in the spacing between the downholder and the deflection piece but cannot jump from the deflection piece. Without the downholder there is the risk of the chain piece jumping from the deflection piece when the chain piece starts to vibrate. Furthermore, the chain piece in extensive operation tends to increase in length, on account of which the chain tension is reduced. The elongation of the chain in turn leads to the freedom of movement of the chain piece in a manner orthogonal to the curved face increasing, this making it easier for a chain to jump from said chain piece. The chain piece does not contact the downholder in the normal operation. The chain piece impacts on the side of the downholder that is opposite the curved face only in a vibrating movement of said chain piece, and is prevented from jumping off the deflection piece by said downholder.

It is expediently provided, according to at least one embodiment, that the spacing is smaller than the height of the chain link plates and the spacing is larger than the diameter of the rollers. The position of the downholder in relation to the curved face of the deflection piece is decisive in terms of the functional mode of the downholder. The spacing of the downholder from the curved face is smaller than the largest dimension of the chain piece. Said largest dimension of the chain piece is formed by the height of the chain link plates. Inner chain link plates and outer chain link plates are included in the term chain link plates. On account of the spacing being smaller than said height of the chain link plates, the latter do not fit through the spacing and thus effectively prevent the chain piece from jumping off. However, the spacing has to be dimensioned such that the chain piece can freely move therein in the normal operation. To this end, the spacing has to be larger than the external diameter of the rollers or the chain rollers, respectively. On account thereof, the downholder does not impede the normal movement of the chain piece on the deflection piece.

It is provided, according to at least one embodiment, that the downholder is not connected to the deflection piece. The downholder in this embodiment is disposed independently of the deflection piece on the chain deflection system. To this end, the downholder is attached to a fixed frame or framework, for example. The downholder and the deflection piece can thus be assembled and disassembled in a mutually independent manner.

It is furthermore provided, according to at least one embodiment, that the downholder is connected in a releasably fixed manner to the deflection piece. The downholder in this embodiment is attached to the deflection piece. In the case of the deflection piece being embodied so as to be movable, the downholder thus moves conjointly with the deflection piece such that the spacing is at all times maintained and the chain piece is reliably guided, even in the case of a moving deflection piece. The deflection piece and the downholder in this embodiment form a functional group which may also contain further components or elements.

It is provided, according to at least one embodiment, that the spacing is embodied so as to be adjustable. The spacing in this embodiment can be adjusted when commissioning the chain deflection system or during the operation of the chain deflection system. This has the advantage that the spacing can be subsequently adapted, for example in the event of the chain having been stretched. The downholder for this adjustable embodiment can be disposed in a guide, for example, and adjustment elements such as screws, for example, can be provided for varying the position of the downholder. Such an adjustable spacing, or an adjustable position, of the downholder, respectively, can be provided for embodiments in which the downholder is fixedly connected to the deflection piece. Alternatively, such an adjustment capability can of course also be provided for a downholder which is not fixedly connected to the deflection piece but is disposed on the framework or the frame of the chain deflection system, for example.

In one design embodiment it is provided that the downholder has at least one face which is provided for contacting the chain piece on the chain link plates or the rollers. The downholder in this embodiment has a face which is favorably embodied so as to be planar. Alternatively, said face can also be embodied so as to be bent or curved in a manner corresponding to the curved face of the deflection piece. Such a curved face can be curved in a convex or a concave manner. Said face is provided for contacting the external edge of the chain link plates. Said external edges of the chain link plates impact on the face of the downholder when the chain piece vibrates, and on account thereof are prevented from jumping from the deflection piece. Alternatively, the face of the downholder in terms of the width dimension thereof can be embodied so as to be similar to the thickness of the deflection piece, and guiding the chain piece between the chain link plates, thus on the rollers. It would also be conceivable for a second deflection piece which has a shape which complements that of the first deflection piece to be used as a downholder.

It is furthermore provided, according to at least one embodiment, that a fastening bolt is provided, wherein the deflection piece is disposed so as to be rotatable about the rotation axis of the fastening bolt and the deflection piece by way of a connection piece is connected to a detector, in particular a chain breakage detector or a force detector. The deflection piece in this embodiment, in addition to the function thereof of deflecting the chain piece, is used for monitoring the functioning capability of the entire chain deflection system. To this end, a fastening bolt by way of which the deflection piece is fastened to an immovable hard surface is first provided. Said fastening using the fastening bolt is however not rigid but permits a movement of the deflection piece. In order for said movement to be enabled, either the fastening bolt can be mounted so as to be movable in the deflection piece, or alternatively the connection between the fastening bolt and the deflection piece can be embodied so as to be rigid and the connection between the fastening bolt and the hard surface can instead be embodied so as to be movable. On account of such a fastening having a fastening bolt, a degree of freedom in terms of rotation is favorably generated for the deflection piece, the deflection piece being mounted so as to be rotatable about the axis of symmetry of the fastening bolt.

The deflection piece is furthermore connected to a detector which monitors the orderly functioning of the chain deflection system. Said detector favorably monitors parameters which are associated with the chain piece. For example, a chain breakage detector thus monitors whether the chain piece is present or whether there is a breakage in the chain piece. In analogous manner, a force detector monitors the force present in the chain piece and can of course also identify a chain breakage. The items of information pertaining to the chain piece determined by such detectors are used for monitoring the chain deflection system. A corresponding open-loop or closed-loop controller in which the items of information of the detector are received as input signals and corresponding output signals are generated based on the type of input signals is favorably provided. The connection between the deflection piece which is disposed so as to be movable at least to a minor extent and the detector takes place by way of a connection piece which may be embodied in various types. For example, the connection piece is thus embodied as a rigid connection pin. Alternatively, the connection piece can also be embodied so as to be flexible, for example as a belt, a wire, a rope, or a chain. In the operation of the chain deflection system the chain piece is deflected in terms of the direction of movement thereof by the deflection piece. Forces herein act from the chain piece onto the deflection piece and vice versa. The deflection piece which is movably mounted on the fastening bolt is at least slightly moved on account of said forces. This movement of the deflection piece is transmitted to the detector by the connection piece. The detector then converts said transmitted movement and/or the force transmitted herein to a signal which in turn is used for controlling the chain deflection system in an open-loop or closed-loop manner.

It is provided, according to at least one embodiment, that a spring is disposed in the detector and the deflection piece introduces a force into the detector by way of the connection piece, said force acting counter to the spring force. The detector in this embodiment is embodied as a force meter. As has been described above, said detector is coupled to the deflection piece by way of a connection piece. A spring is disposed in the detector such that said spring preloads the connection piece in relation to the housing of the detector. To this end, the installed spring presses or pulls the connection piece in one direction. The characteristic, in particular parameters such as the spring constant, of the installed spring are known. The detector, the connection piece, and the deflection piece are now mutually disposed such that a force which is directed counter to the spring force of the spring installed in the detector is generated by virtue of the movement of the chain piece about the deflection piece. The force generated by the chain piece thus acts in the direction counter to the preloading of the connection piece by the spring installed in the detector. The higher the force generated by the chain piece, the more the preloading force is compensated. A chain deflection system of this type may comprise a detector of very simple construction. Such a simple detector is a simple switch which closes on account of the preloading described. When the force generated by the chain piece finally exceeds the preloading force, the switch opens and a binary signal in the detector is generated on account thereof. Alternatively, the detector may also be embodied such that an analog force signal which can provide information pertaining to the force present in the chain piece, for example, is generated by way of a force sensor. Preloading of the detector can take place within the detector, as has already been described above. Alternatively or additionally, preloading of the deflection piece or of the connection piece may also take place outside the detector. To this end, one or a plurality of springs can be disposed between the deflection piece and a locationally fixed bearing point, for example, said spring preloading the deflection piece in relation to the forces generated by the chain piece.

It is furthermore provided, according to at least one embodiment, in the proposal that a detector operating in a non-contacting manner which checks the presence of the chain piece of the chain or the load thereon is provided. In this embodiment, a detector which is not mechanically coupled to the deflection piece is provided. Instead, a detector which operates in a non-contacting manner and which is independent of the deflection piece is provided. By virtue of said independence, the detector may indeed be disposed on the deflection piece but may also be attached to an entirely different location. A detector operating in a non-contacting manner has the advantage that no mechanical wear arises thereon and long service life can thus be taken into account.

In one design embodiment of the proposal it is provided that the detector operating in a non-contacting manner has an optical sensor or a sensor which operates in a non-contacting manner according to the electromagnetic operating principle, in particular a Hall sensor. The detector operating in a non-contacting manner in this embodiment has an optical sensor. Said optical sensor establishes, for example, whether a light source is covered by a chain which is present. Should the chain rupture, the light source is no longer covered and the optical sensor registers said light and on account thereof identifies the chain breakage. Optical sensors which operate differently, for example which determine the contrast between the chain and the background thereof without an additional light source being required may also be provided. Alternatively or additionally, non-contacting sensors which operate electrically or electromagnetically may also be provided. For example, a Hall sensor can be used for checking in a non-contacting manner the presence of a chain containing metal. In general, all sensors and types of sensor which operate in a non-contacting manner are suitable for use in a detector for a chain deflection system.

It is furthermore provided, according to at least one embodiment, that the deflection piece is disposed so as to be movable in a linear manner in relation to a stationary detector. In this embodiment, a linear mobility in relation to a stationary detector is provided instead of the rotary mobility of the deflection piece described above. The various embodiments of detectors described apply in analogous manner to a deflection piece which is disposed so as to be movable in a linear manner. The fastening of a deflection piece which is disposed so as to be movable in a linear manner in relation to the stationary hard surface can take place by way of rails, for example.

In one design embodiment it is provided that the chain deflection system is equipped with two deflection pieces, wherein one of the latter has a convex face and one has a concave face, and the two curved faces conjointly form a gap which is at least the size of the diameter of the rollers of one chain piece configured as a roller chain. Two deflection pieces which interact are provided in this embodiment. The curvature, or the direction of curvature, of said two deflection pieces is embodied so as to be mutually complementary. The two deflection pieces are disposed such that the chain piece in a sliding fit is capable of being pushed through the two curved faces of said two deflection pieces. To this end, the gap created is dimensioned such that the latter is slightly larger than the diameter of the chain rollers of the chain piece embodied as a roller chain. It is advantageous in such a chain deflection system that a chain piece can be deflected or diverted, respectively, in the direction of compression as well as in the direction of traction by this type of an arrangement of two deflection pieces.

It is expediently provided, according to at least one embodiment, that the deflection piece embodied as a plate-shaped disk is embodied so as to be displaceable transversely to the running direction of the chain piece. The plate-shaped deflection piece in this embodiment is embodied so as to be displaceable in order to compensate tolerances in the chain deflection system. On account of the deflection piece being capable of being displaced, said deflection piece can align itself in a self-acting manner in the running direction of the chain piece. In chain deflection systems in which the chain piece is guided over comparatively long regions, in particular over regions having a length of several meters, a mutually aligned arrangement of a plurality of deflection pieces is difficult to produce. By providing a displacement capability of one or a plurality of deflection pieces it is achieved that said deflection pieces in a self-acting manner align in a position in which the deflection of the chain piece takes place at the minimum resistance.

In one further embodiment it is provided that at least one bolt which is attached in a locationally fixed manner is provided, and the deflection piece is mounted on the bolt so as to be movable in two directions, wherein the bolt extends beyond both sides of the disk-shaped deflection piece. This embodiment is a particularly simple solution of a deflection piece which is displaceable transversely to the running direction of the chain piece. The mounting of the deflection piece on a bolt which is attached in a locationally fixed manner represents a solution which is simple in terms of construction. Of course, the bolt may also be disposed fixedly in the deflection piece and be guided so as to be movable in a mounting outside the deflection piece.

It is furthermore provided, according to at least one embodiment, that the deflection piece is rotatably mounted, wherein one axle which is disposed on the deflection piece so as to face away from the curved face is provided, and the axle is mounted so as to be rotatable in a counterpart. The deflection piece in this embodiment is mounted so as to be rotatable or pivotable. Such a mounting enables a positioning of the deflection piece that is offset at an angle in relation to the ideal direction to be compensated. Specifically when a chain piece is guided over a comparatively long distance it cannot be precluded that the deflection pieces are mutually disposed at an error in terms of angle. Without countermeasures, increased wear would arise on the chain piece and on deflection pieces on account thereof. Faulty positioning of deflection pieces which are disposed in succession is compensated for by mounting the deflection piece in a rotatable manner.

It is provided, according to at least one embodiment, that the face has a consistent curvature radius. The face, or the curved face, in this embodiment is curved in a consistent manner at a uniform curvature radius.

It is furthermore provided, according to at least one embodiment, in the proposal that the face of the deflection piece has straight and curved regions. The face, or the curved face, in this embodiment does not run in a consistent manner but has different regions. Said regions herein can have different curvature radii or else be embodied so as to be straight or planar, respectively. The properties of the deflection piece can be adapted to the specific application by way of alternating or variable curvature radii about a deflection piece. For example, it is thus favorable for at least two curved regions of the face to be provided, said two curved regions being disposed on two sides of a straight region so as to deflect a chain piece by an angle of more than 90°. Of course, deflection pieces having a plurality of curved regions and a plurality of straight regions of the face are also conceivable.

In one design embodiment of the proposal it is provided that at least one curvature radius of the face of the deflection piece is embodied such that a plurality of rollers of the chain piece embodied as a roller chain bear on the face. The curvature radius of the face or of the curved face in this embodiment is chosen to be so large that a plurality of successive rollers of the roller chain can bear on said face. On account thereof, the bearing face of the chain piece on the deflection piece is enlarged, and the wear in guiding the chain piece is reduced. The more chain rollers bear on the deflection piece the less wear on the chain deflection system.

It is furthermore provided, according to at least one embodiment, that two deflection pieces are provided, and the chain piece is guided successively over both deflection pieces, wherein the peaks of the deflection pieces have a mutual spacing A and said spacing is embodied such that the latter preferably does not correspond to an even multiple of the pitch T of the chain piece. The pitch T is understood to be the axle spacing between two successive chain rollers. The spacing A herein is defined as the spacing that is created between the respective peaks of deflection pieces that are disposed so as to be adjacent. On account of this ratio between the spacing A and the pitch T it is ensured that the movement transverse to the running direction of the chain piece is asynchronous on two adjacent deflection pieces, uncontrolled vibrating of the chain piece being counteracted on account thereof.

In one design embodiment it is provided that two deflection pieces are provided and the chain piece is guided successively over both deflection pieces and the two faces have dissimilar curvature radius. In this embodiment, two deflection pieces which have dissimilar curvature radius of the curved faces are disposed successively in the running direction of the chain. A synchronous movement of the chain piece transverse to the running direction is also prevented by such dissimilar curvature radii, the risk of uncontrolled vibration of the chain piece thus being reduced.

It is expediently provided, according to at least one embodiment, that the chain deflection system is part of the lifting means and interacts with the lift drive, for example an electric motor, hydraulic motor, or a lifting cylinder, for example. The chain deflection system in this embodiment is a component part of a lifting means. A lift drive which is favorably embodied as a motor can be a further component part of said lifting means, for example.

The disclosure comprises, according to at least one embodiment, an automated parking device having a frame on which at least one movable, in particular liftable or lowerable, platform is provided, the automated parking device being equipped with a chain which is at least partially part of one chain deflection system as described, wherein the respective deflection piece is disposed on the frame or on the platform. A parking device according to the disclosure comprises at least one chain deflection system according to one of the embodiments described above. The chain of the automated parking device herein corresponds to the chain piece of the chain deflection system. An automated parking device according to the disclosure favorably comprises a chain deflection system having a plurality of deflection pieces, wherein the chain piece in the running direction thereof is deflected multiple times.

It is furthermore provided, according to at least one embodiment, in the proposal that the chain deflection system serves as a synchronizing unit and herein ensures in particular that the respective opposite platform ends or sides where the chain deflection systems are disposed on the platform are lifted or lowered at the same speed so as to avoid canting of the platform in the frame or the lifting assembly, respectively, and to thus enable an ideally breakdown-free operation of the automated parking device. A so-called synchronizing unit enables the movement of one lift drive to be transmitted to or on other sides of the moving platform. By way of a chain deflection system having one or a plurality of deflection pieces, the movement of a lift drive which is disposed so as to be asymmetrical to the platform can be passively transmitted to other locations of the platform. Fewer lift drives are required on account of such a transmission, the entire parking device becoming more cost-effective and more reliable in terms of breakdowns on account thereof. A passive transmission of the movement herein is to be understood such that no torques are transmitted by way of axles or shafts. Synchronizing devices which have gear wheels or sprockets which are connected by way of shafts and which actively transmit a torque from one chain piece to another chain piece exist in the prior art. By providing deflection pieces according to the disclosure, such an active transmission of torque is not possible since said deflection pieces specifically do not have any toothing which meshes with the chain rollers. Another term for a synchronizing system which passively transmits tensile forces or compressive forces in a chain piece is a synchronized lifting device. One lift drive is typically provided in each case on the right and the left on the movable platform. The lifting movement of said lift drive is uniformly transmitted to the front and the rear by a chain deflection system according to the disclosure. However, a chain deflection system according to the disclosure is not limited to the use in an automated parking device.

In one design embodiment of the proposal it is provided that the chain deflection system is part of the lifting means and interacts with the lift drive, for example an electric motor, a hydraulic motor, or a lifting cylinder, for example.

In one design embodiment of the proposal it is provided that the length of the face of the deflection piece in terms of the implemented variation of the direction of the direction of force transmitted by the chain is from 5° to 720°, for example.

It is furthermore provided, according to at least one embodiment, that the face of the deflection piece is configured so as to be helical.

It is furthermore provided, according to at least one embodiment, that the face of the deflection piece is curved so as to be convex or concave.

In one design embodiment it is provided that the deflection piece is mounted so as to be pivotable or longitudinally movable. The arrangement herein is chosen such that no infinite rotatable mounting of the deflection piece is provided.

It is expediently provided, according to at least one embodiment, that the deflection piece is connected to a detector, for example a force detector or a chain breakage detector.

In one further embodiment it is provided that the chain deflection system is equipped with two deflection pieces, one of the latter having a convex face and one having a concave face.

It is furthermore provided, according to at least one embodiment, that the face has a thickness or a height which is slightly less than the inner spacing of the opposite inner chain link plates of the chain configured as a roller chain.

In this connection, it is emphasized in particular that all of the features and properties, but also procedures described with respect to the chain deflection system can expediently also be transferred in respect of the drafting of the claims to the automated parking device proposed according to the disclosure and can be used within the meaning of the disclosure and are considered to also be disclosed. The same also applies in the opposite direction, that is to say features which are structural, i.e. are according to the device, that are mentioned only with regard to the automated parking device can also be taken into consideration and claimed within the scope of the claims for the chain deflection system and are likewise included in the disclosure.

BRIEF DESCRIPTION OF THE FIGURES

The disclosure is schematically illustrated in particular in an exemplary embodiment in the drawing in which:

FIGS. 1b, 2b show in each case in a vertical section in the transverse direction the automated parking device according to the disclosure as per FIGS. 1a, 2a;

FIGS. 3a, 3b, 3c show in each case in a detailed view various exemplary embodiments of the chain deflection system according to the disclosure;

FIG. 4 shows in a partial sectional illustration a detail of the chain piece of the chain deflection system according to the disclosure;

FIG. 5 shows in a detailed view a further exemplary embodiment of the chain deflection system according to the disclosure;

FIGS. 7a, 7b, 7c, 7d show in two lateral views, one plan view, and one frontal view a further exemplary embodiment of the chain deflection system according to the disclosure;

FIG. 8 shows in a lateral view a further exemplary embodiment of the chain deflection system according to the disclosure;

FIG. 9 shows in a lateral view a further exemplary embodiment of the chain deflection system according to the disclosure;

FIG. 10 schematically shows in a lateral view the effect of the uncontrolled vibration of a chain;

FIG. 11 shows in a lateral view an exemplary embodiment of the chain deflection system according to the disclosure having improvements for counteracting the uncontrolled vibration of the chain; and FIG. 12 shows in a frontal view a further exemplary embodiment of the chain deflection system according to the disclosure having a downholder.

DETAILED DESCRIPTION

In the figures, identical or mutually corresponding elements are each denoted by the same reference signs and are therefore not described again, unless expedient. The disclosures contained in the entire description are expediently transferrable to identical parts with the same reference signs or the same component designations. The positional details selected in the description, e.g. top, bottom, laterally, etc. are also related to the directly described and illustrated figure and can expediently be transferred in the event of a change in position to the new position. Furthermore, individual features or combinations of features from the different exemplary embodiments shown and described can also be independent, inventive solutions or solutions according to the disclosure.

Figure 1A:
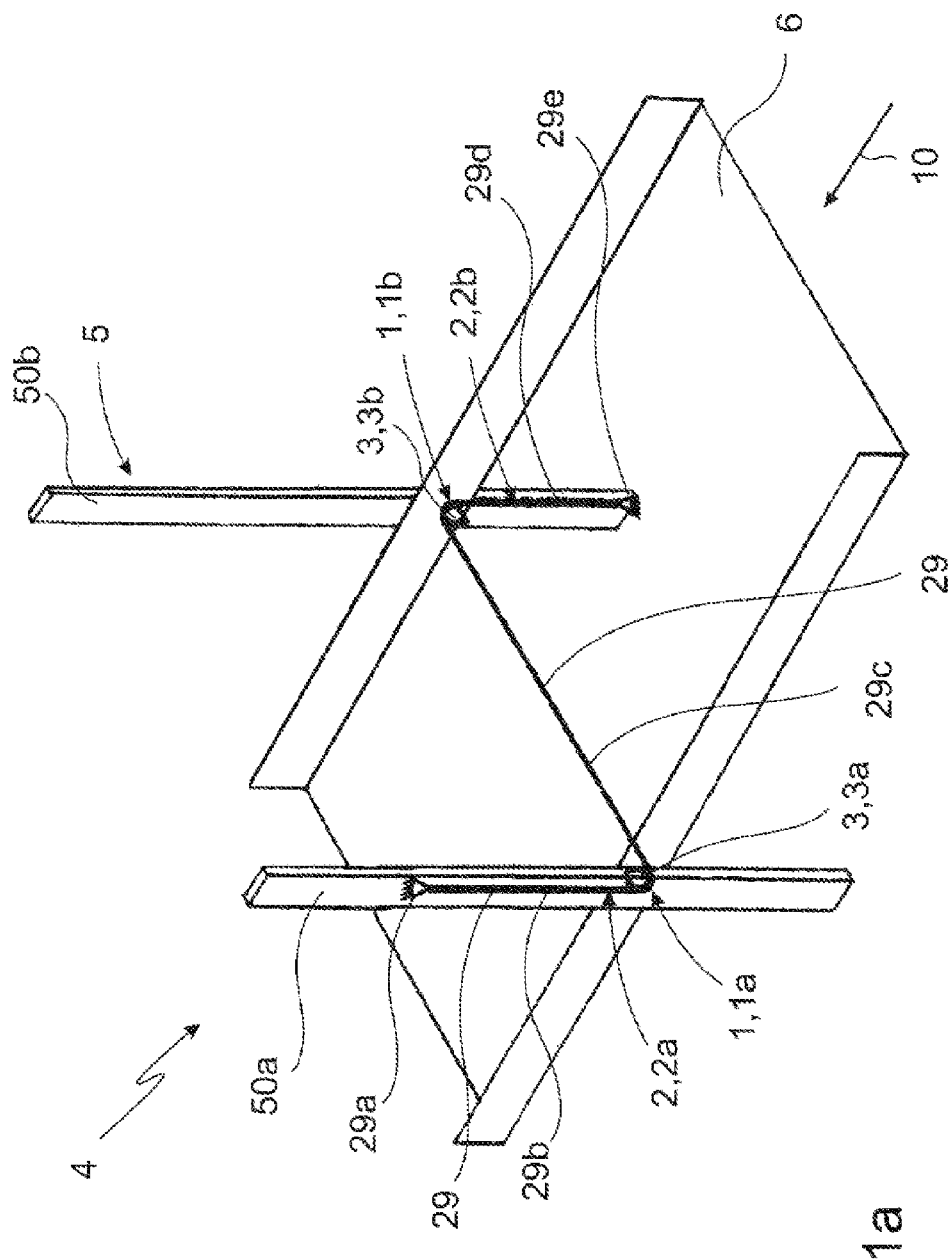
FIGS. 1a, 2a show in each case in a three-dimensional view various exemplary embodiments of the automated parking device according to the disclosure.

An automated parking device 4 is schematically illustrated in FIG. 1a. For reasons of clarity, this illustration is reduced to the essential elements, this illustration and the description of this exemplary embodiment, but however do not limit the use of the disclosure proposed in any way. An automated parking device 4 is typically composed of a frame 5 on which at least one movable platform 6 is provided. A drive, for example a hydraulically acting operating cylinder, hydraulic motor, or an electric drive is provided for the movement of the platform 6, in particular the lifting or lowering movement of the latter, said drive however not being shown here.

It is also to be noted that the platform 6 is embodied so as to be "transparent", that is to say that elements running below the platform 6, thus elements obscured by the platform 6, are shown in solid lines. The same illustration has also been chosen in FIG. 2a.

The automated parking device shown in FIG. 1a (and also in FIG. 2a) is equipped with only one platform 6, without the disclosure however being limited thereto. Of course, the scope of application of the disclosure is not limited in terms of the number of platforms 6.

The frame 5 here is also only schematically illustrated and is ideally composed of only two supports 50*a* and 50*b* which are oriented so as to be substantially vertical. This schematic illustration of the frame 5 suffices for explaining the effect according to the disclosure. Of course, other variants of automated parking devices 4 which have more complex frame arrangements or per se are implemented only by way of said two shown supports 50*a*, 50*b* are also known. All these variants are included in the disclosure.

In the exemplary embodiment shown in FIG. 1*a* the chain 29 is deflected by two deflection pieces 3*a*, 3*b* which are located on the platform 6. The chain 29 herein in a first, vertically running, portion 29*b* from an upper securing point 29*a* which is located on the first support 50*a*, first runs vertically downward until said chain 29 in the first deflection piece 3*a* is deflected to the left, i.e. to the horizontal. The horizontally running portion 29*c* herein preferably runs below the platform 6 and is therefore protected by the latter.

The first, vertical, portion 29*b* and the horizontal portion 29*c* herein form the chain piece 2*a* which conjointly with the deflection piece 3*a* represents a first chain deflection system 1, 1*a*.

The chain 29 in the exemplary embodiment shown in FIG. 1*a*, when viewed in the direction of travel 10, is guided from the left on the deflection piece 3*a* toward the right to the deflection piece 3*b*. The horizontal portion 29*c* is thus oriented so as to be orthogonal to the direction of travel 10, wherein the direction of travel 10 describes the direction of driving onto or off the platform 6 for parking or removing a vehicle.

In the right second deflection piece 3*b*, the horizontal portion 29*c* is again preferably deflected orthogonally to the vertical and in the latter forms the second, vertically running, chain piece 29*d* which is secured in the second, lower, securing point 29*e* which is located on the second support 50*b*.

The second, vertical, portion 29*d* and the horizontal portion 29*c* herein form the second chain piece 2*b* which conjointly with the deflection piece 3*b* represents the second chain deflection system 1, 1*b*.

Figure 1B:
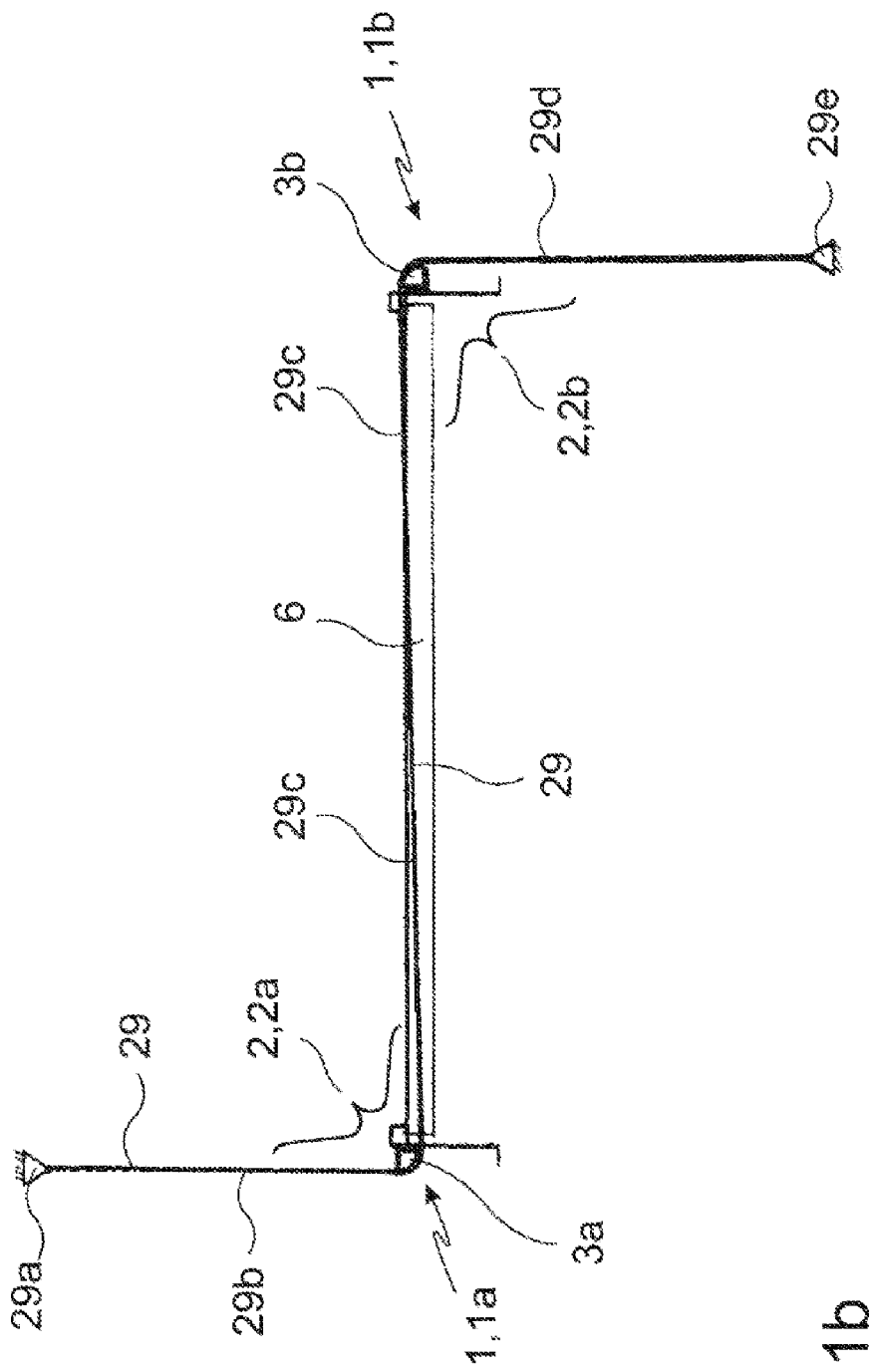

FIG. 1*b* in the direction of travel 10 describes a vertical section according to FIG. 1*a*. It can be readily seen that the upper securing point 29*a* is disposed above the lower securing point 29*e*.

Figure 2A:
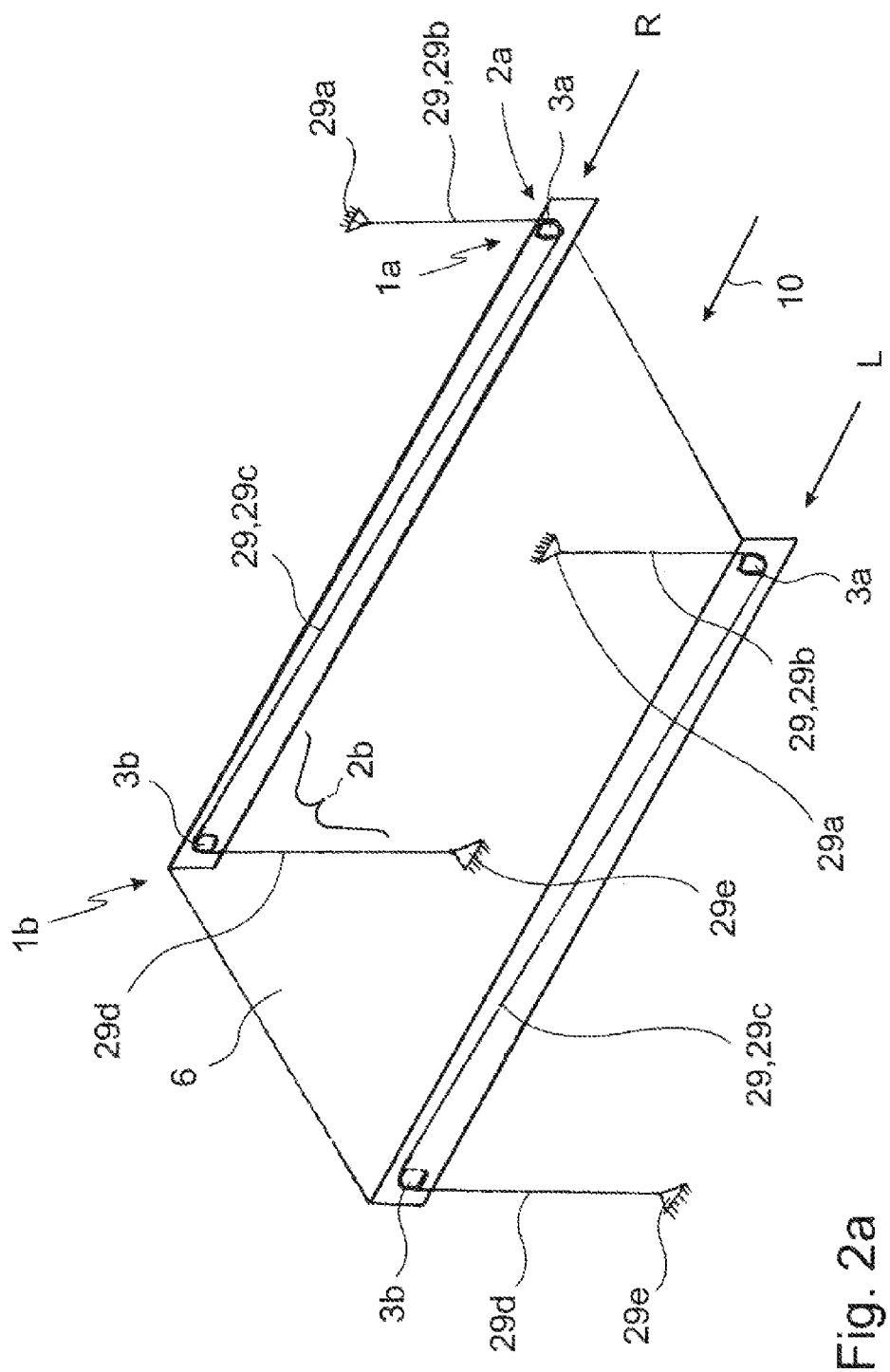

The chain 29 is deflected by way of two deflection pieces 3*a*, 3*b* which are located on the platform 6 also in the exemplary embodiment shown in FIG. 2*a*. However, when viewed in the direction of travel 10, one chain 29 is in each case provided on the left side (identified by L) and on the right side (identified by R). The profile of the chain 29 herein is described only for one of the sides, the other side being of identical configuration.

The chain 29 herein, from an upper securing point 29*a*, which is located on a support or the building (not shown), in a first, vertically running, portion 29*b* initially runs vertically downward until said chain 29 in the first deflection piece 3*a* is deflected to the left, i.e. to the horizontal. The horizontally running portion 29*c* herein runs so as to be parallel to the platform 6, preferably below the latter, and is therefore protected by said platform 6.

The first, vertical, portion 29*b* and the horizontal portion 29*c* herein form the chain piece 2*a* which conjointly with the deflection piece 3*a* represents a first chain deflection system 1, 1*a*.

The chain 29 in the exemplary embodiment shown in FIG. 2*a*, when viewed in the direction of travel 10, from the front, on the deflection piece 3*a*, is guided to the rear, toward the deflection piece 3*b*. The chain portion 29*c* is oriented so as to be parallel to the direction of travel 10.

The horizontal chain portion 29*c* in the right, second, deflection piece 3*b* is again preferably deflected orthogonally to the vertical and in the latter forms the second, vertically running, chain piece 29*d* which is secured in the second, lower, securing point 29*e*.

The second, vertical, portion 29*d* and the horizontal portion 29*c* herein form the second chain piece 2*b* which conjointly with the deflection piece 3*b* represents the second chain deflection system 1, 1*b*.

Figure 2B:
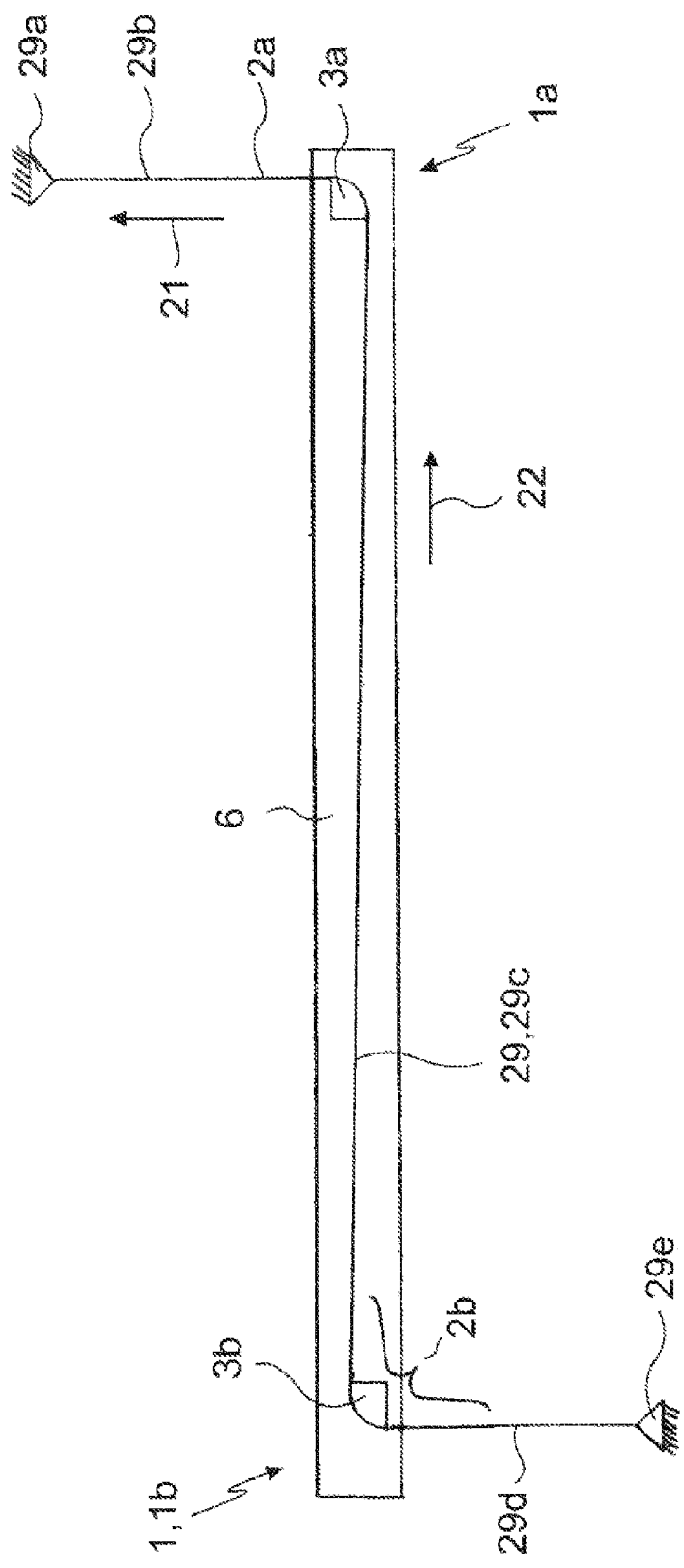

FIG. 2*b* in a direction orthogonal to the direction of travel 10 describes a vertical section according to FIG. 2*a*. It can be readily seen that the upper securing point 29*a* is disposed above the lower securing point 29*e*. The directions of force, here in particular directions of the tensile forces of the respective chain portions 29*b* and 29*c*, in FIG. 2*b* are indicated by the arrows 21 and 22 which are in each case oriented so as to be parallel to the respective chain portions 29*b* and 29*c*, respectively. In the exemplary embodiment shown here, or else as in the other exemplary embodiments as per FIGS. 1*a*, 1*b*, and 2*a*, the deflection piece 3, 3*a*, 3*b* of the chain deflection system 1, 1*a*, 1*b* causes a deflection or diversion of the directions of force 21, 22.

Tensile forces are usually transmitted by a chain piece of the chain deflection system. Without however limiting the disclosure thereto, it is also possible for compressive forces to be deflected using a correspondingly configured deflection piece. In the latter, the face 30 in which the chain piece settles and rolls in this instance is not located so as to be radially inward but so as to be radially outward (cf. FIG. 5).

The chain deflection system 1 provided according to the disclosure in the exemplary embodiment shown in FIGS. 1*a*, 1*b*, 2*a*, 2*b* is implemented in an automated parking device 4 which is likewise included in the disclosure. Said chain deflection system 1 herein serves in an exemplary manner as a synchronizing unit or a synchronized lifting unit, wherein two chain deflection systems 1, 1*a*, 1*b* are in each case provided along the chain 29. It is characteristic in the specific application of a synchronizing unit herein that the ends of the chain 29 are secured in the respective securing points 29*a* or 29*e*, respectively, on the frame 5 or on the building, thus are not unsecured.

This however does not limit the disclosure to said specific application. The chain deflection system proposed according to the disclosure can also be implemented and used in other cases, also in automated parking devices 4 according to the disclosure in which the chain end is free. It is likewise provided that the chain deflection system 1 according to the disclosure is used in a lifting means for lifting or lowering a platform such as, for example, in an automated parking device 4 according to the disclosure.

Figure 3A:
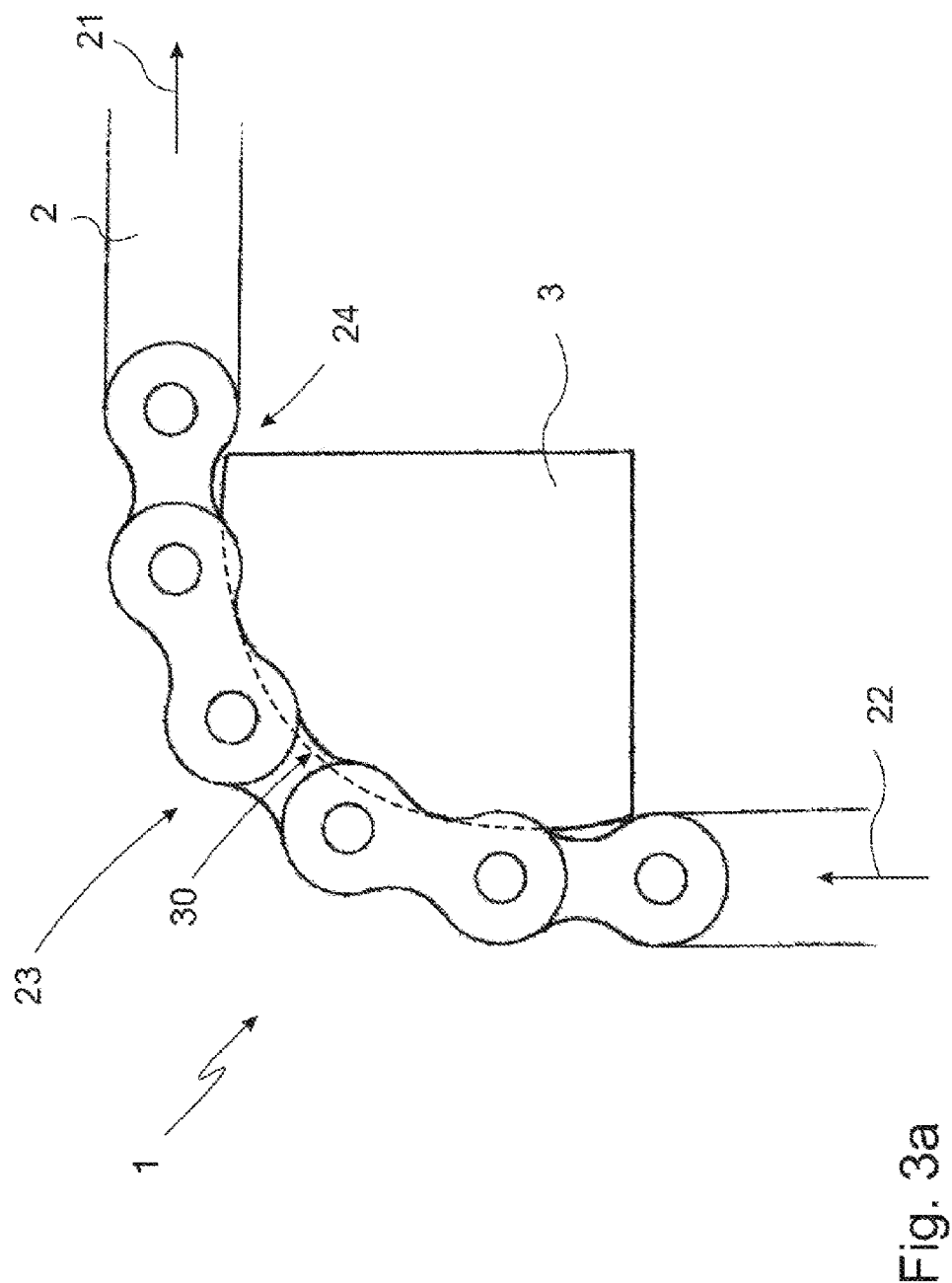

A first exemplary embodiment of the chain deflection system 1 according to the disclosure is shown in FIG. 3*a*. The chain deflection system 1 according to the disclosure is composed of a chain piece 2, preferably a roller chain 20 (such as will yet be described in more detail in particular in FIG. 4), and a deflection piece 3 which has a curved face 30.

The deflection piece 3 is configured, for example, as a 90° segment of a plate-shaped disk having a specific plate thickness or a thickness 33, wherein the length of the angular segment does not limit the disclosure. The length of the face 30 (when viewed in the direction of force 21, 22) in terms of the respective segment can be embodied so as to be from 5° to 360° and even beyond the latter (for example up to 540° or 720°), wherein a helical design of the face 30 is favorable in segments of more than 180°, for example.

The disclosure at this point discloses segments at a spacing of 5°, meaning that the face 30 of the deflection piece 3 is described in steps of 5° of the angular segment of deflection and is thus disclosed in the form of 5°, 10°, 15°, etc. to 360°, 540°, or 720°.

Tensile forces 21, 22 are transmitted by way of the chain 2 in the exemplary embodiment shown in FIG. 3*a*. Therefore, the deflection piece 3 is located on the radially inner side 24 in the arc 23 of the chain 2.

The construction of the chain deflection system 1 as per FIG. 3*b* is very similar to that of the exemplary embodiment as per FIG. 3*a*; only the points of differentiation will therefore be described here.

The deflection piece 3 in FIG. 3*a* is disposed so as to be immovable, i.e. fixed, for example on the frame 5 or the platform 6. The deflection piece 3 in the exemplary embodiment as per FIG. 3*b* has a certain, tightly limited, mobility. To this end, a fastening bolt 32 which permits a certain limited movement of the deflection piece 3 about the rotation axis 31 of the fastening bolt 32 is provided. The deflection piece 3 by way of the connection piece 70 is connected to a detector 7. The detector 7 is a chain breakage detector or a force detector, for example.

The functional mode of the detector 7 will be described hereunder.

The movement of the chain piece 2, corresponding to the directions of traction 21, 22, leads to a movement of the deflection piece 3 in a counter-clockwise direction about the rotation axis 31, this being illustrated by the arrow 33. On account thereof, the deflection piece 3 moves away from the detector 7; a force which strives to pull the connection piece 70 out of the detector 7 acts on the connection piece 70. To this end, a corresponding spring which makes available a spring force which acts counter to the said pulling force is disposed in the detector 7.

The consequence of this arrangement is thus that a force which counter to the force of an internal spring of the detector 7 attempts to move the connection piece 70 out of the detector 7 acts in the orderly functioning of the chain deflection system. When this state is disturbed, for example because the chain 2 breaks or ruptures, the counterforce of the internal spring of the detector 7 is cancelled and this defective behavior can then be identified and indicated by a corresponding switch. Advantageously, the chain deflection system provided according to the disclosure thus simultaneously also comprises a monitoring function.

Not only the breakage of the chain can be detected by said detector 7 herein, but in an alternative design embodiment it is also possible for the force, a tensile force or else a compressive force, acting on the chain 2 to be measured by the detector 7 and to be transmitted to the plant controller, for example to an automated parking device or to another plant, for the purpose of checking and monitoring. Alternatively, the detector 7 may also be embodied in a non-contacting manner. Such a detector 7 which operates in a non-contacting manner does not have any fixed, physical, connection to the deflection piece 3. A detector 7 operating in a non-contacting manner can have an optical sensor, for example, and thus check the presence of or the load on the chain. Likewise, a non-contacting sensor operating according to the electro-magnetic principle, for example a Hall sensor, can be used. According to the disclosure, non-contacting detectors 7 as well as detectors 7 which contact the deflection piece 3 may be used. Corresponding overload situations of the plant can thus be identified at an early stage.

Figure 3C:
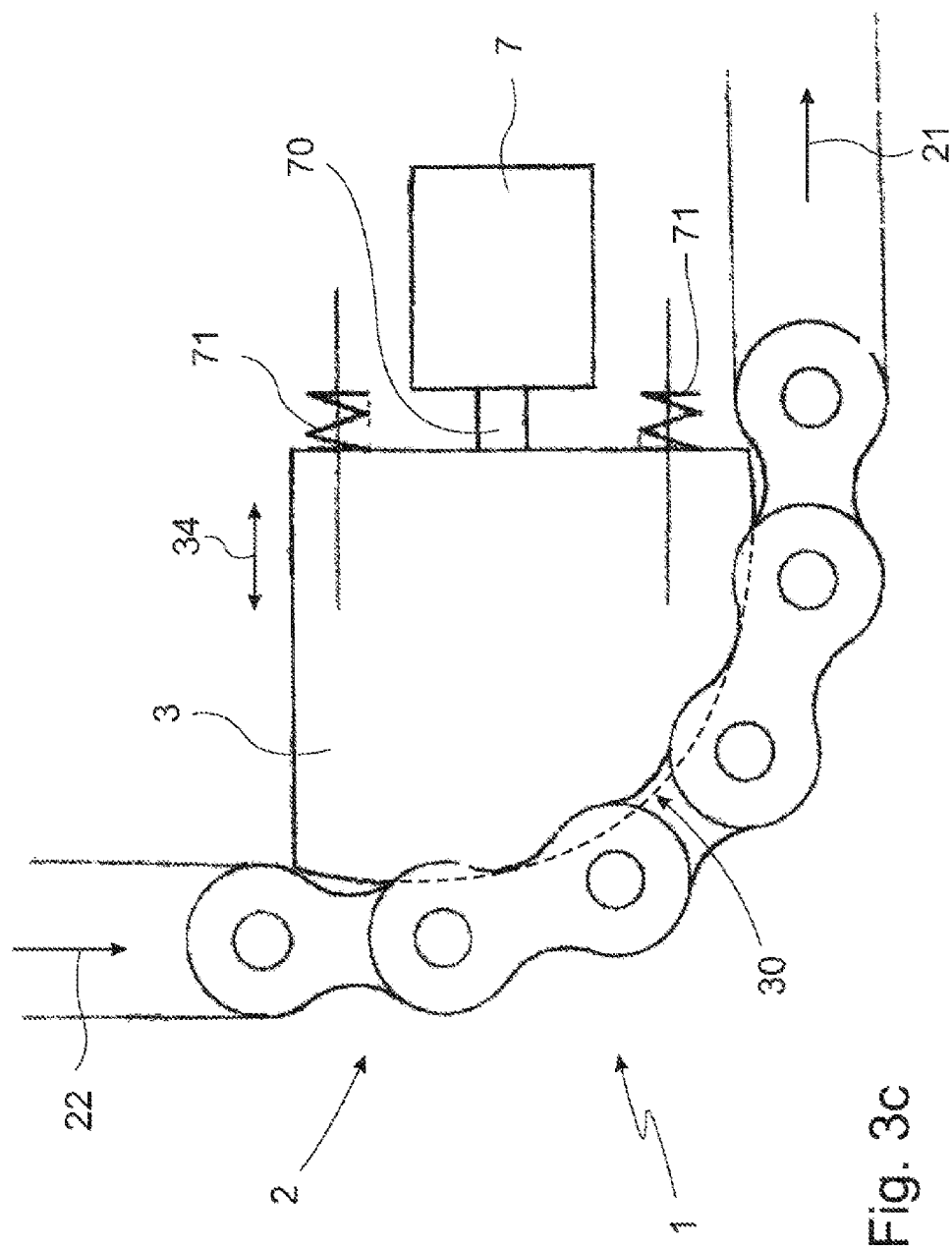

FIG. 3*c* is very similar to the exemplary embodiment as per FIG. 3*b*. Here too, only the points of differentiation are pointed out so as to avoid any redundant repetitions. A relative mobility of the deflection piece 3 about a rotation axis 31 was provided in FIG. 3*b*. A linear mobility (indicated by the double arrow 34) of the deflection piece 3 in relation to the stationary detector 7 is provided in the exemplary embodiment as per FIG. 3*c*. The two restoring springs 71 which act counter to the force oriented toward the right and which in turn in the normal operation act on the chain assembly aligned in terms of traction (see direction of the tensile forces 21, 22) are readily seen in the schematic view. The deflection piece 3 again by way of the connection piece 70 is connected to the detector. The functional mode of the detector 7 here is again the same as has been described in conjunction with FIG. 3*b*.

Besides a convex design embodiment of the face 30 of the deflection piece 3, as has been shown for example in FIGS. 3*a*, 3*b*, and 3*c*, it is also possible for a deflection piece 3 having a face 30 in a concave design to be provided. Such a variant is also included in the disclosure. With the aid of a deflection piece 3 having a convex face 30 it is expediently possible for chains that are subjected to compressive forces to be deflected. The chain deflection system 1 in a further variant is however to be configured such that chains which are subjected to tensile forces as well as compressive forces could be deflected. Such an embodiment can be seen in FIG. 5. The chain deflection system herein is complemented by a further deflection piece 3 in such a manner that a first deflection piece 3 having a concave face 30 and a second deflection piece 3 having a convex face 30 are disposed and the two faces 30 face one another so as to form a gap in which the chain piece 2 can be accommodated. The spacing of the two faces 30 herein is at least as large as the diameter of the rollers of the chain piece 2. Such dimensioning ensures that the rollers of the roller chain 2 reliably roll on only one of the faces 30, depending on the force conditions. The deflection piece 3 which in FIG. 5 is illustrated at the bottom right herein corresponds to the deflection pieces 3 described, for example, in FIG. 3 and guides the chain piece 2 when the latter is under tension. A further deflection piece 3 is illustrated at the top left, the curved face 30 of said further deflection piece 3 being configured so as to be complementary to the curved face 30 of the other deflection piece 3. A gap exists between the two curved faces 30, the width of said gap being somewhat larger than the external diameter of the rollers 205 of the chain piece 2. The chain piece 2 can thus slide through the gap by way of a clearance fit. When the chain piece 2 is under tension, the rollers 205 thereof bear on the curved face 30 of the deflection piece 3 which is illustrated at the bottom right, a small spacing existing between the rollers 205 and the curved face of the deflection piece 3 which is disposed at the top left. In contrast, when the chain piece is under thrust, the rollers 205 bear on the deflection piece 3 which is illustrated at the top left, and a clearance existing between the rollers 205 and the deflection piece 3 is illustrated at the bottom right. The embodiment shown in FIG. 5, having two deflection pieces 3, is thus suitable for deflecting a chain piece 2 under tension as well as when operated under thrust. This embodiment is furthermore suitable for preventing the chain piece 2 from unintentionally jumping from one of the two deflection pieces 3. The deflection piece 3 which in each case is opposite prevents the chain piece 2 departing from the gap between the two deflection pieces 3.

A detail of the chain deflection system 1 according to the disclosure is shown in FIG. 4. The viewing direction herein is directed radially or orthogonally onto the face 30, and parts of the chain 2 are shown in a cut-away fashion. The construction of the chain piece 2 which is in particular configured as a roller chain 20 is as usual. The inner chain link plates 202 sit on a bush which here is referred to as the sleeve 203 which is located on the bolt 204. The outer chain link plates 201 sit directly on the bolt 204. A roller 205 sits on the sleeve 203 so as to be located between the inner chain link plates 202. The chain 2 by way of the rollers 205 rolls on the face 30. The face 30 has a thickness 33 which is slightly smaller than the inner spacing 206 of the opposite inner chain link plates 202.

The consequence of this dimensioning is that the roller chain 2, 20 by way of the respective inner sides 207 of the inner chain link plates 206 (on account of the form-fit) is reliably guided on the deflection piece 3.

Of course, it is also possible for the disclosure to be implemented using a duplex chain or a multiplex chain; the deflection piece 3 is to be correspondingly adapted in this instance.

Figure 6C:
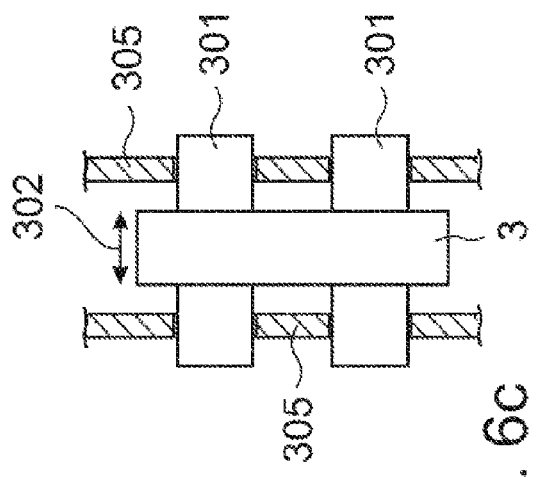
FIGS. 6a, 6b, 6c show in a lateral view and two plan views a further exemplary embodiment of the chain deflection system according to the disclosure.
Figure 6B:
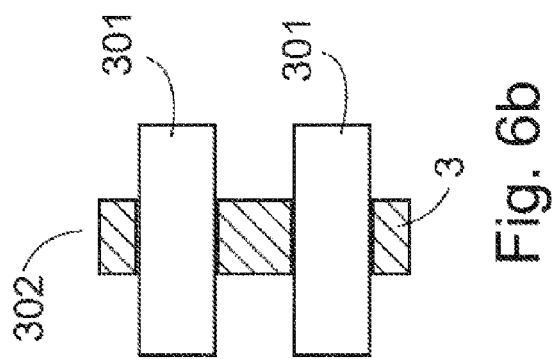
Figure 6A:
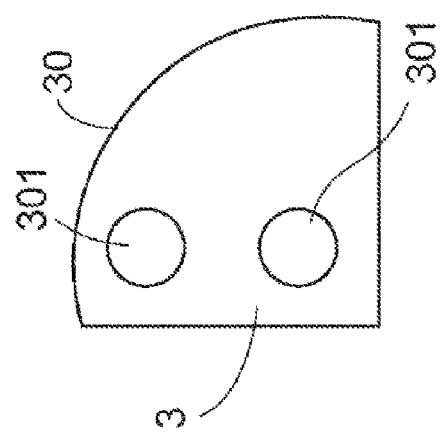

FIGS. 6a, 6b, 6c in a lateral view and two plan views show a further exemplary embodiment of the chain deflection system according to the disclosure. FIG. 6a shows in a lateral view a deflection piece 3 which is part of a chain deflection system. For improved clarity, a chain is not illustrated. The radiused face 30 is provided for guiding and deflecting the chain, the interaction between the chain and the deflection piece 3 herein being as in FIG. 3a. The deflection piece 3 in the exemplary embodiment is mounted so as to be displaceable into the drawing plane, or out of the drawing plane, respectively. The two bolts 301 are provided to this end here. The two cylindrical bolts 301 run into the drawing plane. The deflection piece 3 has two circular bores for receiving the bolts 301. The internal diameter of said circular bores herein is somewhat larger than the external diameter of the bolts 301. A sliding fit between the bolts 301 and the deflection piece 3 is thus created. FIG. 6b shows a plan view of the exemplary embodiment from FIG. 6a. It can be readily seen here that the two cylindrical bolts 301 extend beyond both sides of the disk-shaped deflection piece 3. This enables the deflection piece 3 to be able to move in two directions on the bolts 301, as is indicated by the arrow 302. The two bolts 301 are favorably attached fixedly to the device or to the plant for which the chain deflection system is provided. This movable mounting of the deflection piece 3 on the bolts 301 in plants in which a chain is guided by way of a plurality of deflection pieces 3 serves for enabling tolerances to be compensated. When a comparatively large spacing, for example of several meters, is provided between two deflection pieces 3, it is difficult to assemble said two deflection pieces 3 so as to be precisely aligned with one another. A mutually aligned positioning of two deflection pieces 3 may prove important in certain embodiments with a view to an operation of the chain deflection system with no wear or at least little wear. The deflection piece 3 illustrated in this exemplary embodiment here offers advantages in comparison to a rigidly fastened deflection piece 3; on account of the movable mounting on the bolts 301, a transverse offset of two deflection pieces 3, or the transverse offset between a deflection piece 3 and a fixed chain fastening at the end of the chain, is compensated, the or a deflection piece 3 simply moving in a self-acting manner along the bolts 301 to the position in which the chain is imparted the least rolling resistance. In one plant, all deflection pieces 3 with the exception of one of the latter are favorably mounted so as to be displaceable. Of course, rigidly assembled and displaceable deflection pieces 3 in various combinations may also be disposed in a plant. A displacement capability, or a movable mounting of a deflection piece 3 can also be implemented by providing another number of bolts 301. For example, only one bolt 301 or three bolts 301 may also be provided for mounting. Furthermore, it is not mandatory that cylindrical bolts 301 are used. Bolts 301 having another cross-section, for example an angular cross-section, are also conceivable. The bores or recesses in the deflection piece 3 in this instance are to be adapted in analogous manner to the external shape of the bolts 301. In order for the displacement capability of the deflection piece 3 to be improved, a friction means may be provided between the bolts 301 and the deflection piece 3. Said friction means can either be a lubricant such as grease or oil, or else a sliding bushing which is disposed between the bolts 301 and the deflection piece 3. Such a sliding bushing can be composed of plastics material or brass, for example, and be press-fitted into the corresponding bores in the deflection piece 3. FIG. 6c shows an embodiment which is slightly modified in comparison to FIGS. 6a and 6b. The two bolts 301 in FIG. 6c are fixedly connected to the deflection piece 3, that is to say so as not to be displaceable. This can be achieved, for example, by way of a press-fit. In order for the mobility of the deflection piece 3 to be established, the bolts 301 are mounted in a bearing 305 so as to be displaceable in bores. The embodiment in FIG. 6c illustrates a kinematic reversal of the embodiment in FIG. 6b.

FIGS. 7a, 7b in a lateral view and in a plan view show a further exemplary embodiment of the chain deflection system according to the disclosure. This exemplary embodiment likewise serves for compensating tolerances, or compensating inadvertently created assembly errors when assembling a deflection piece 3 in a chain deflection system, respectively. While the exemplary embodiment in FIGS. 6a and 6b is provided for compensating a transverse offset between two deflection pieces 3, the exemplary embodiment in FIGS. 7a to 7d is provided for compensating an angular offset between two deflection pieces 3, or between a deflection piece 3 and a fixed fastening of the chain at one of the ends thereof. Such compensation is achieved by a rotatable mounting of the deflection piece 3. An axle 303 is attached to the deflection piece 3 to this end. Said axle can either be disposed so as to be rotationally fixed on the deflection piece 3 and rotatably guided in a bearing 305, or the axle 303 can also be disposed so as to be rotatable in the deflection piece 3 and by way of the end thereof that faces away from the deflection piece 3 to be fastened in a rotationally fixed manner to another part of the chain deflection system. FIG. 7a shows a lateral view of a deflection piece 3 having an axle 303 which is fastened in a rotationally fixed manner. The deflection piece 3 in this view has the shape of a quadrant. The radiused face 30 on which a chain (not shown) is deflected and guided is directed toward the top right. The axle 303 is disposed on the lower end of the deflection piece 3, so as to face away from the face 30. The quadrant-shaped deflection piece 3 has two straight sides. The axle 303 herein runs so as to be orthogonal to one of said straight sides and so as to be parallel to the other of said straight sides. The axle 303 herein is disposed so as to be directly adjacent to the straight side to which said axle 303 runs in parallel. On account of this arrangement on the periphery of the deflection piece 3, almost the entire face 30 can rotate about the axle 303. On account thereof, the deflection piece 3 adapts to a potential angular offset and compensates the latter in a particularly positive manner. FIG. 7b shows a plan view of the exemplary embodiment from FIG. 7a. The rotation axis of the axle 303 is symbolized by dashed lines. The deflection piece 3 is rotatable about said rotation axis, this being illustrated by the arrow 304. As can be seen in FIG. 7b, the diameter of the axle 303 is somewhat larger than the thickness of the deflection piece 3. A larger diameter of the axle 303 facilitates the mounting of said axle in a counterpart. The diameter of the axle 303 may however also be chosen to be smaller than the thickness of the deflection piece 3. At a smaller diameter, the axle by way of a consistent diameter can be press-fitted directly into a bore in the deflection piece 3. The axle 303 in the embodiment illustrated has a smaller diameter in the upper region. Said upper region is press-fitted into a bore in the deflection piece 3. Alternatively, the axle 303 can of course also be screw-fitted or welded to the deflection piece 3. In order to compensate an angular offset between two deflection pieces 3, the deflection piece 3 in the exemplary embodiment illustrated rotates about the rotation axis of the axle 303. The two exemplary embodiments from FIGS. 6a, 6b and 7a to 7d can of course also be combined with one another such that a transverse offset and an angular offset can be simultaneously compensated. For example, the rotationally fixed mounting for the axle 303 (not shown) could in turn be disposed so as to be displaceable on a stationary part of the chain deflection system. Said displaceable mounting in which the axle 303 is in turn rotatably mounted enables a simultaneous compensation of errors in terms of position and angle. Alternatively, the deflection piece 3 could of course also be embodied so as to be laterally displaceable in relation to the axle 303. A form of a rotatably mounted deflection piece 3 which is modified in comparison to FIG. 7a can be seen in FIG. 7c. The embodiment illustrated in FIG. 7c is provided with an axle 303 on two sides, i.e. at the top and the bottom, said axle 303 in each case being rotatably mounted in a locationally fixed bearing 305. The mounting on two sides results in improved stability. A guide 36 for the second, upper, mounting is attached to the deflection piece 3. The chain piece 2 (not illustrated) is guided by said guide 36. A downholder 35 which is illustrated by dashed lines is attached to the guide 36 in the upper region. Said downholder 35 serves for ensuring that the chain piece 2 does not inadvertently jump from the deflection piece 3. The functional principle of such a downholder 35 is described in the context of FIG. 12. The guide 36 and thus also the downholder 35 rotate conjointly with the deflection piece 3 in the movement of the latter. FIG. 7d shows a frontal view of the embodiment illustrated in FIG. 7c. It can be seen from the front that the guide 36 is fastened laterally on the deflection piece 3 and at the upper end of said guide 36 for mounting supports a second axle 303. A sub-region of the guide 36 is illustrated with dotted lines on the right side. Said sub-region is optional; in one variant, the guide can extend so as to be inherently closed on both sides of the deflection piece 3. In this case, the chain piece 2 (not illustrated) has to be introduced into the guide between the deflection piece 3 and the downholder 35 from the front. The high level of stability of this closed embodiment is advantageous. Alternatively, the region of the guide 36 illustrated with dotted lines can also be omitted such that the guide extends only on one side of the deflection piece 3. This embodiment is advantageous since the chain piece 2 can also be inserted into the guide 36 from the side where the region illustrated with dotted lines is located. An embodiment without the region illustrated with dotted lines is however less stable than the embodiment having a guide 36 on both sides. The downholder 35 is disposed so as to be adjustable in the guide 36. The outwardly directed faces of the downholder 35 are guided by the inner faces of the guide 36. The downholder 35 and the guide 36 are moreover connected to one another by way of the adjustment mechanism 38. In a particularly simple embodiment, said adjustment mechanism 38 is formed by a threaded bolt to which one or a plurality of nuts for establishing the vertical position of the downholder 35 are attached. The adjustment mechanism 38 can of course also be embodied in a different manner. The downholder 35 can be adjusted or readjusted by the adjustment mechanism 38 during commissioning or during the operation of the chain deflection system.

FIG. 8 in a lateral view shows a further exemplary embodiment of the chain deflection system according to the disclosure. In the exemplary embodiments described previously, the chain on the deflection piece 3 is at all times guided or deflected, respectively, on a concave or convex face 30 with a consistent curvature radius. In the exemplary embodiment illustrated in FIG. 8, a deflection piece 3 which has a face 30 which does not have a consistent curvature radius can be seen. The face 30 at the ends thereof here is curved in a circular manner and between these curved regions has a straight, planar, region. The deflection piece in the lateral view has two straight edges which are mutually orthogonal and face away from the face 30.

FIG. 9 in a lateral view shows a further exemplary embodiment of the chain deflection system according to the disclosure. This exemplary embodiment of a deflection piece 3 also does not have a face 30 with a consistent curvature radius. Rather, the face 30 here has three curved regions having dissimilar curvature radii and two straight, planar, regions. The deflection piece 3 in the lateral view here has only one straight edge which faces away from the face 30.

FIG. 10 in a lateral view schematically shows the effect of the uncontrolled vibration of a chain. FIG. 10 is composed of two sub-images which are illustrated on the left and the right. A chain link of a chain piece 2 can in each case be seen in both sub-images. The same chain link is illustrated at different points in time in both sub-images. The chain-link (the chain piece 2) moves from the left to the right. The chain link in the left sub-image is shown in a state in which both chain rollers bear on the deflection piece 3. Only the upper part of the deflection piece 3 is illustrated. Both chain rollers bear on the right and the left of the peak of the deflection piece 3. The same chain link is illustrated in the right sub-image, said chain-link now having travelled somewhat toward the right. The left chain roller of the chain link now bears on the peak of the deflection piece 3. The chain link on its way from the left sub-image to the right sub-image has moved upward in that the left chain roller has rolled up to the peak on the deflection piece 3. The chain link on its further path to the right moves downward again since the left chain roller rolls downhill from the peak of the deflection piece 3. In a movement of the chain piece 2 from the left to the right by way of the deflection piece 3, the chain piece 2 thus moves in the vertical direction by the amplitude 210. Uncontrolled vibration of the chain piece 2 can arise on account of said vertical movement. Such uncontrolled vibration is undesirable for most applications. The larger the curvature radius of the deflection piece 3 on which the chain piece 2 bears, the smaller the amplitude 210. A large curvature radius of the deflection piece 3 is thus optimal in order to prevent uncontrolled vibration of the chain piece 2. The larger the curvature radius, the larger also the bearing face of the chain piece 2 on the deflection piece 3. More rollers bear on the deflection piece 3 when there is a larger bearing face; the contact pressure per unit area on the deflection piece 3 is thus reduced at the same load. The requirements set for the mechanical load-bearing capability of the deflection piece 3 is in turn reduced in the case of a lower contact pressure per unit area. On account thereof, either a more cost-effective material can be used, or the service life of the deflection piece 3 is increased when using the same material because there is a reduction in wear. The curvature radius, or the bearing face, respectively, of the deflection piece 3 and the material of the latter are thus operatively connected. The curvature radius and the material of the deflection piece 3 have to be mutually adapted, depending on the specific application and load. There are also specific applications in which there is only little installation space available, and only small curvature radii are thus available for the deflection piece 3, or the face 30, respectively. The probability of a chain piece 2 which is guided across one or a plurality of deflection pieces 3 inadvertently vibrating in an uncontrolled manner is increased in this case.

FIG. 11 in a lateral view shows an exemplary embodiment of the chain deflection system according to the disclosure having improvements to counter the uncontrolled vibration of the chain. A chain piece 2 which is guided from the left to the right by way of two deflection pieces 3 can be seen in FIG. 11. The chain has a pitch T, this being understood as the spacing of axles of adjacent chain rollers. In the event of both deflection pieces 3 having the same curvature radius R1, R2 and the peaks of both deflection pieces 3 having a mutual spacing which corresponds to a whole number of pitches T, the uncontrolled vibration of the chain described in the context of FIG. 10 would in each case take place simultaneously on both deflection pieces 3. Such a simultaneous, vertical, movement of the chain piece 2 at two locations significantly amplifies the uncontrolled vibration of the chain piece 2. Two solutions which counter said amplified uncontrolled vibration of the chain piece 2 have been developed. One possibility is to choose the spacing A between the two peaks of the two deflection pieces 3 such that said spacing A does not correspond to an even multiple of the pitch T. Even herein is to be understood the mathematical definition, specifically a whole number without fractions. It is ensured on account thereof that the chain rollers cross the peak of both deflection pieces 3 at different points in time. The vertical movement of the chain piece 2 on both deflection pieces 3 thus takes place in a temporally offset manner and therefore does not lead to an amplification of the uncontrolled vibration. The second solution according to the disclosure lies in providing dissimilar curvature radii R1 and R2 for both deflection pieces 3. Said dissimilar curvature radii R1 and R2 cause different amplitudes on both deflection pieces 3, on account of which an amplification of the uncontrolled vibration is likewise prevented. Of course, it is also possible for said two possibilities for avoiding the uncontrolled vibration of the chain 2 to be combined with one another.

FIG. 12 in a frontal view shows a further exemplary embodiment of the chain deflection system according to the disclosure having a downholder. The functional mode of a downholder 35 is schematically illustrated in FIG. 12. Only the elements which are required for understanding the downholder 35 are illustrated in FIG. 12; potentially required connection elements are not illustrated for the sake of clarity. A deflection piece 3 on which a chain piece 2 is guided is illustrated at the bottom in the frontal view. The downholder 35 which here has a face that faces the chain piece 2 and which is wider than the width of the chain piece 2 is disposed above the chain piece 2. Said face and the curved face 30 of the deflection piece 3 formed the spacing 37. The chain piece 2 on the external sides thereof has in each case one chain link plate (illustrated is an inner chain link plate 202); the roller 205 can be seen in the center of the chain piece. The chain link plates have a height h which is smaller than the spacing 37. The outwardly directed edges of the chain link plate have a spacing y from the circumference of the roller 205. The spacing z is defined between the outer edge of the chain link plate and the surface of the downholder 35 that is directed toward the chain piece 2. The spacing z is at all times smaller than the spacing y. On account thereof, the chain piece 2 has a clearance in the spacing 37 so that said chain piece 2 can freely move therein in the normal operation. However, by virtue of the dimensioning of the spacing 37, the chain piece 2 cannot depart from the position thereof between the deflection piece 3 and the downholder 35. On account thereof, the chain piece 2 cannot jump from the deflection piece 3 even in the event of uncontrolled vibration.

The claims which are filed at this point with the application and those claims filed later are without prejudice for the purpose of achieving further protection.

Should it be found here upon closer examination, in particular also of the relevant prior art, that one feature or another, although advantageous, is not absolutely imperative in relation to the aim of the invention, then, of course, the attempt will be made to achieve a wording which no longer has such a feature, in particular in the main claim. It is also the case that such a sub-combination is covered by the disclosure of this application.

It should also be noted that the configurations and variants of the invention which are described in the various embodiments and shown in the figures can be combined in any desired manner with one another. It is possible here for individual features, or a number of features, to be interchanged as desired. These combinations of features are likewise disclosed here.

The dependency references given in the dependent claims relate to the development of the subject matter of the main claim by way of the features of the respective dependent claim. However, these should not be understood to be obviating the need to achieve independent substantive protection for the features of the appended dependent claims.

Features which have been disclosed only in the description, or also individual features from claims which comprise a number of features, can at any time be adopted in the independent claim/claims as being of importance which is essential to the invention for the purpose of distinguishing the invention from the prior art, to be precise even when such features have been mentioned in conjunction with other features or achieve particularly favorable results in conjunction with other features.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An automated parking device comprising a frame on which at least one liftable or lowerable platform is provided, the automated parking device being equipped with a chain which is at least partially part of at least one chain deflection system, wherein the at least one chain deflection system is composed of at least one chain piece and a deflection piece which has a curved face, the at least one chain piece at least partially bearing on the curved face wherein a direction of traction or compression of the at least one chain piece is deflected, wherein the respective deflection piece is disposed on the frame or on the platform and the deflection piece is disposed such that the latter has a degree of freedom in terms of rotation of less than 360°, wherein the deflection piece is embodied as a plate-shaped disk, wherein the curved face of the deflection piece is curved so as to be convex, and wherein the at least one chain piece is embodied as a roller chain piece and chain rollers of said roller chain piece contact the curved face of the deflection piece and in a movement of the at least one chain piece roll on the curved face.

2. The automated parking device as claimed in claim 1, wherein the at least one chain piece in a first region from a locationally fixed clamping point runs vertically to a first deflection piece, the at least one chain piece subsequently in a second region from the first deflection piece runs horizontally to a second deflection piece, and finally in a third region from the second deflection piece runs vertically to a further locationally fixed clamping point.

3. The automated parking device as claimed in claim 1, wherein the deflection piece has a thickness which is slightly less than an inner spacing between opposite inner chain link plates of the roller chain piece.

4. The automated parking device as claimed in claim 1, wherein a downholder which is disposed at a spacing from the curved face of the deflection piece is provided, the at least one chain piece being guided through said spacing and wherein a conjoint guiding of the deflection piece and the downholder causes the deflection piece and the downholder to be unable to depart from said spacing.

5. The automated parking device as claimed in claim 1, wherein a fastening bolt is provided, wherein the deflection piece is disposed so as to be rotatable about a rotation axis of the fastening bolt and the deflection piece by way of a connection piece is connected to a detector.

6. The automated parking device as claimed in claim 5, wherein the detector is a chain breakage detector or a force detector.

7. The automated parking device as claimed in claim 1, wherein the at least one chain deflection system is equipped with two deflection pieces, wherein one of the two deflection pieces has a convex face and one has a concave face, and the convex and concave faces conjointly form a gap which is at least the size of a diameter of the chain rollers of one of the roller chain pieces.

8. The automated parking device as claimed in claim 1, wherein the deflection piece embodied as a plate-shaped disk is embodied so as to be displaceable transversely to a running direction of the roller chain piece.

9. The automated parking device as claimed in claim 1, wherein the deflection piece is rotatably mounted, wherein one axle which is disposed on the deflection piece so as to face away from the curved face is provided, and the axle is rotatably mounted in a counterpart of the axle.

10. The automated parking device as claimed in claim 1, wherein at least one curvature radius of the face of the deflection piece is embodied such that a plurality of rollers of the at least one roller chain piece bear on the face.

11. The automated parking device as claimed in claim 1, wherein two deflection pieces are provided and the roller chain piece is guided successively over both deflection pieces, wherein peaks of the deflection pieces have a mutual spacing (A) and said mutual spacing (A) is embodied such that the latter does not correspond to an even multiple of a pitch (T) of the roller chain piece.

12. The automated parking device as claimed in claim 1, wherein two deflection pieces are provided and the roller chain piece is guided successively over both deflection pieces and the two faces have dissimilar curvature radii (R1, R2).

13. The automated parking device as claimed in claim 1, wherein the at least one chain deflection system serves as a synchronizing unit and ensures that the respective opposite platform ends or sides where the at least one chain deflection system is disposed on the platform are lifted or lowered at the same speed so as to avoid canting of the platform in the frame, and to thus enable breakdown-free operation of the automated parking device.

* * * * *